(12) United States Patent
Sylvain

(10) Patent No.: US 8,756,283 B2
(45) Date of Patent: Jun. 17, 2014

(54) INTEGRATED WEB PORTAL FOR FACILITATING COMMUNICATIONS WITH AN INTENDED PARTY

(75) Inventor: Dany Sylvain, Gatineau (CA)

(73) Assignee: Rockstar Consortium USLP, Plano, TX (US)

( * ) Notice: Subject to any disclaimer, the term of this patent is extended or adjusted under 35 U.S.C. 154(b) by 1144 days.

(21) Appl. No.: 11/960,286

(22) Filed: Dec. 19, 2007

(65) Prior Publication Data

US 2009/0164639 A1    Jun. 25, 2009

(51) Int. Cl.
*G06F 15/16* (2006.01)
(52) U.S. Cl.
USPC ........... 709/206; 709/229; 709/227; 709/250; 709/200; 715/207; 726/27
(58) Field of Classification Search
USPC ............. 709/206, 229.25, 200, 227; 715/207; 726/27
See application file for complete search history.

(56) References Cited

U.S. PATENT DOCUMENTS

| | | | |
|---|---|---|---|
| 5,603,054 A * | 2/1997 | Theimer et al. .................... 710/6 |
| 5,715,453 A * | 2/1998 | Stewart .......................... 715/207 |
| 5,761,683 A * | 6/1998 | Logan et al. .................... 715/206 |
| 5,812,865 A * | 9/1998 | Theimer et al. ............... 709/228 |
| 5,897,635 A * | 4/1999 | Torres et al. ........................... 1/1 |
| 5,999,525 A | 12/1999 | Krishnaswamy et al. |
| 6,094,578 A | 7/2000 | Purcell |
| 6,189,008 B1 * | 2/2001 | Easty et al. ............................ 1/1 |
| 6,310,889 B1 * | 10/2001 | Parsons et al. ................. 370/466 |
| 6,320,534 B1 * | 11/2001 | Goss ........................... 342/357.1 |
| 6,351,771 B1 * | 2/2002 | Craddock et al. ............. 709/227 |
| 6,360,262 B1 | 3/2002 | Guenthner et al. |
| 6,363,421 B2 * | 3/2002 | Barker et al. .................. 709/223 |
| 6,480,901 B1 | 11/2002 | Weber et al. |
| 6,732,170 B2 * | 5/2004 | Miyake et al. ................. 709/223 |
| 6,792,605 B1 * | 9/2004 | Roberts et al. ................ 719/313 |
| 6,798,755 B2 * | 9/2004 | Lillie et al. .................... 370/312 |
| 6,950,501 B1 * | 9/2005 | Chaturvedi et al. ............. 379/52 |
| 7,085,807 B2 * | 8/2006 | Simpson et al. ............. 709/203 |
| 7,092,498 B2 * | 8/2006 | Hariri et al. ................. 379/93.01 |
| 7,117,445 B2 * | 10/2006 | Berger .......................... 715/752 |
| 7,136,919 B1 * | 11/2006 | Foncarnier .................... 709/224 |
| 7,162,526 B2 * | 1/2007 | Dutta et al. .................... 709/229 |
| 7,197,565 B2 * | 3/2007 | Abdelaziz et al. ............ 709/226 |
| 7,234,115 B1 | 6/2007 | Sprauve et al. |

(Continued)

OTHER PUBLICATIONS

One phone number for life? Possible . . . ; Jul. 2, 2009; UPI; 3 Pages.*

(Continued)

*Primary Examiner* — Andrew Georgandellis
*Assistant Examiner* — Anthony Fabbri
(74) *Attorney, Agent, or Firm* — Schmeiser, Olsen & Watts LLP; Michael Rodriquez

(57) ABSTRACT

Described are a system and method for presenting, to a first user, information about a second user to enable the first user to select an appropriate communication means for communicating with the second user. A service node receives from a web browser executing at a communication device used by the first user a request for a web page associated with the second user. The service node collects information related to a current status of activity of the second user, determines one or more options for establishing communications with the second user, and transmits to the first user the web page having the current activity of the second user and the one or more communications options.

19 Claims, 16 Drawing Sheets

(56) References Cited

U.S. PATENT DOCUMENTS

| | | |
|---|---|---|
| 7,257,730 B2 | 8/2007 | Spry |
| 7,433,680 B2* | 10/2008 | Jenkins et al. ............ 455/412.1 |
| 7,447,165 B1* | 11/2008 | Sylvain ...................... 370/254 |
| 7,613,695 B1* | 11/2009 | Solomon et al. ................ 1/1 |
| 2001/0034735 A1* | 10/2001 | Sugiyama ................ 707/104.1 |
| 2002/0075305 A1* | 6/2002 | Beaton et al. ................ 345/751 |
| 2002/0087520 A1* | 7/2002 | Meyers ............................ 707/3 |
| 2002/0146005 A1* | 10/2002 | Gallant et al. ................ 370/389 |
| 2003/0046355 A1* | 3/2003 | Rosenberg et al. .......... 709/206 |
| 2003/0069969 A1 | 4/2003 | Renaud |
| 2003/0091026 A1 | 5/2003 | Penfield et al. |
| 2003/0118175 A1* | 6/2003 | Hariri et al. ............ 379/355.02 |
| 2003/0187658 A1* | 10/2003 | Selin et al. ................ 704/270.1 |
| 2005/0044188 A1* | 2/2005 | Nakazawa et al. .......... 709/219 |
| 2005/0149639 A1 | 7/2005 | Vrielink et al. |
| 2005/0226225 A1* | 10/2005 | Shigeta ........................ 370/352 |
| 2005/0246355 A1* | 11/2005 | Ito ................................. 707/100 |
| 2005/0259796 A1* | 11/2005 | Wallenius et al. ......... 379/93.01 |
| 2005/0261011 A1* | 11/2005 | Scott ............................ 455/466 |
| 2005/0273493 A1* | 12/2005 | Buford et al. ................ 709/204 |
| 2006/0153166 A1* | 7/2006 | Kobayashi et al. .......... 370/352 |
| 2006/0161991 A1* | 7/2006 | I'Anson ........................ 726/27 |
| 2006/0264213 A1 | 11/2006 | Thompson |
| 2007/0087766 A1* | 4/2007 | Hardy et al. ................ 455/466 |
| 2007/0104182 A1* | 5/2007 | Gorti et al. .................. 370/352 |
| 2007/0110043 A1* | 5/2007 | Girard ......................... 370/352 |
| 2007/0192299 A1* | 8/2007 | Zuckerberg et al. ............ 707/3 |
| 2007/0288600 A1* | 12/2007 | Arabi et al. .................. 709/219 |
| 2008/0037447 A1 | 2/2008 | Garg |
| 2009/0100378 A1* | 4/2009 | Klassen et al. ............... 715/821 |
| 2009/0135806 A1 | 5/2009 | Pulhug |
| 2009/0141704 A1* | 6/2009 | Eng et al. .................... 370/352 |
| 2009/0323558 A1* | 12/2009 | Meenavalli ................. 370/259 |
| 2010/0241664 A1* | 9/2010 | LeVasseur et al. ........... 707/779 |

OTHER PUBLICATIONS

Sylvain; U.S. Appl. No. 11/960,317, filed Dec. 19, 2007; 60 pages.
Sylvain; U.S. Appl. No. 11/960,341, filed Dec. 19, 2007; 62 pages.
Office Action mailed Jul. 21, 2009 for U.S. Appl. No. 11/960,317.
Final Office Action mailed Feb. 2, 2010 for U.S. Appl. No. 11/960,317.
Non-Final Office Action dated Nov. 24, 2010 for U.S. Appl. No. 11/960,317.
Non-Final Office Action dated Jul. 19, 2011 for U.S. Appl. No. 11/960,341.
Non-Final Office Action in related U.S. Appl. No. 11/960,317, mailed Sep. 28, 2011; 18 pages.
Final Office Action in related U.S. Appl. No. 11/960,317, mailed Mar. 29, 2012; 20 pages.
Final Office Action in related U.S. Appl. No. 11/960,341, mailed Dec. 21, 2011; 13 pages.

* cited by examiner

INTEGRATED WEB PORTAL FOR FACILITATING COMMUNICATIONS WITH AN INTENDED PARTY

FIELD OF THE INVENTION

The present invention relates generally to communications networks. More particularly, the present invention relates to a system and method of collecting status information about a user over a network and making available such information, with options for initiating communications with the user, to prospective callers to facilitate selecting an appropriate communication means for communicating with the user.

BACKGROUND

People today can readily communicate with one another in many different ways. Telephones, cell phones, electronic mail, instant messaging, video conferencing, and application sharing are just some examples to name a few. Despite the many avenues of communication, however, it can be difficult and frustrating effectively to reach someone. For instance, when a caller seeks to speak with someone in particular, that person might be in a meeting or traveling or currently on the telephone. Presently, the caller has little inkling of whether there will be success before making the call. Moreover, information regarding the availability and reachability of the person is generally unavailable, spread about in various places, or requires custom client software to access.

For example, if a caller desires to know if a person is available by telephone, the caller typically needs to call the person, and then often learns that the person is unavailable only upon receiving a busy signal or being directed to voicemail. To know if a person is online (i.e., connected to a computer), the caller may need to launch one or multiple IM (Instant Messaging) client, such as Yahoo!™ or MSN™ client software, provided that the userID of the called person is known and that the called person has pre-authorized the caller. Even if the called person is online, however, it does not ensure that the person is actually at his computer. The caller might then need to send an instant message and wait for a response. As for determining whether a person is in a meeting, a caller can access a number of online calendars (often available within enterprises), but if the caller is external to the enterprise, the online calendar may be inaccessible.

Consequently, to reach a particular person, a caller may need to call various telephone numbers (landline, mobile, and SIP (session initiation protocol) addresses), send email messages in order to coordinate a time when both caller and called are available, access and look up calendar information, launch client software for obtaining presence information, and manually gather availability information from IM (instant messaging) clients. The process is unpredictable, impractical, and often unfruitful.

SUMMARY

In another aspect, the invention features a method for presenting to a first user information about a second user to enable the first user to select an appropriate communication means for communicating with the second user. A service node receives over a network, from a web browser executing at a computing device used by the first user, a request for a web page associated with the second user. The service node collects, over the network, information related to a current status of activity of the second user. The service node determines one or more options for establishing communications with the second user, and transmits, over the network to the first user, the web page having the current activity of the second user and the one or more communications options.

In another aspect, the invention features a service node comprising a web server component receiving from a web browser executing at a computing device used by a first user a request for a web page associated with a second user. An information collector is in communication over a network with one or more servers to obtain information related to a current status of activity of the second user. Logic determines one or more options for establishing communications with the second user. The web server component transmits to the first user the web page having the current activity of the second user and the one or more communications options.

In another aspect, the invention features a communications network for presenting to a first user of a computing device information about a second user to enable the first user to select an appropriate communication means for communicating with the second user. One or more server systems maintain information about a second user. A service node is in communication with the computing device of the first user and with the one or more server systems. The service node comprises a web server component receiving from a web browser executing at the computing device used by the first user a request for a web page associated with the second user; an information collector in communication with the one or more server systems to obtain information related to a current status of activity of the second user; and logic for determining one or more options for establishing communications with the second user. The web server component transmits to the first user the web page having the current activity of the second user and the one or more determined communications options.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Communications networks having a service node as described herein enable users of non-SIP-enabled computing devices (also referred to herein as legacy computing devices) to enjoy real-time multimedia communication sessions with SIP-enabled users. The service node bridges a multimedia communication gap between legacy computing devices and SIP-enabled communication devices by operating as a web interface capable of communicating with legacy computing devices—thus leveraging the ubiquitous web browsers of such computing devices—and as a SIP interface capable of communicating with the SIP-enabled communication devices. In brief overview, the service node in effect "translates" web browser-based communications received from legacy computing devices into SIP-based communications with SIP-enabled communication devices, and SIP communications received from SIP-enabled communication devices into web browser-based communications for sending to the legacy computing devices. Operating as a bridge, the service node establishes media communication paths between legacy and SIP-enabled end users and supports activities such as instant messaging, file transfer, and application sharing.

Advantageously, the functionality provided by the service node enlarges the potential audience with which SIP-enabled users are able to communicate, thereby extending the value of their technological investment. In addition, non-SIP-enabled users are now able to engage in part-time or ad hoc multimedia communications, without having to preinstall and execute a SIP client on their computers or having to register user IDs and passwords. Moreover, their exposure to such multimedia communications may motivate such users to implement a SIP, multimedia configuration (i.e., become SIP-enabled), thus accelerating the spread of SIP throughout the communications network.

Figure 1:
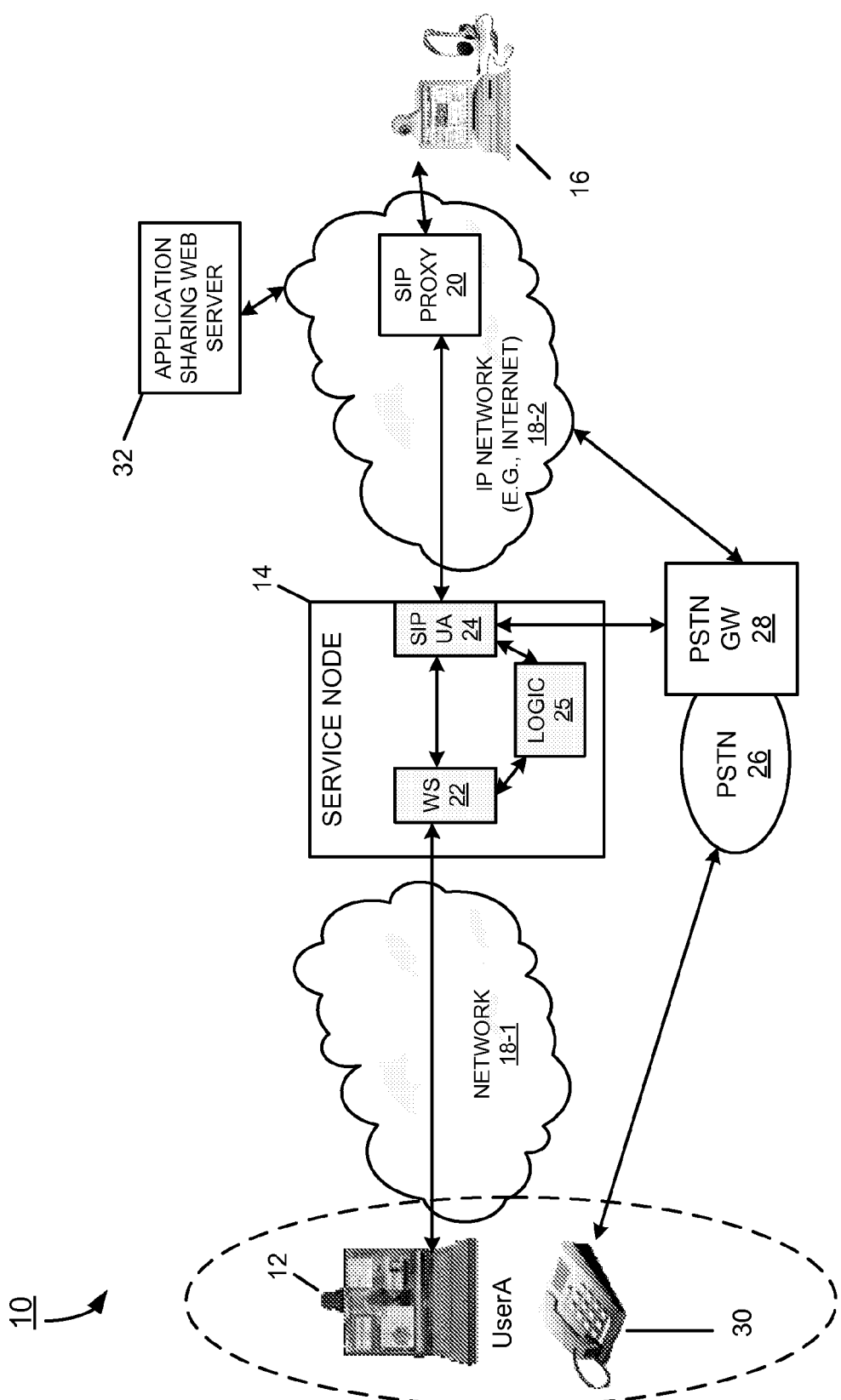
FIG. 1 is a diagram of an embodiment of a communications network including a service node providing a communication bridge between a non-SIP-enabled computing device and a SIP-enabled communication device.

FIG. 1 shows an example of a communications network 10 including a non-SIP-enabled computing device 12, in communication with a service node 14 over a network 18-1. Embodiments of the network 18-1 include, but are not limited to, local-area networks (LAN), metro-area networks (MAN), and wide-area networks (WAN), such as the Internet or World Wide Web. The service node 14 is in communication with a SIP-enabled communication device 16 over an IP (Internet Protocol) network 18-2, such as the Internet, through a SIP proxy 20. The service node 14 can be considered part of either or both networks 18-1, 18-2. In some embodiments, networks 18-1, 18-2 are the same network. The computing device 12 and communication device 16 can connect to the respective networks 18-1, 18-2 through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)).

The communications network 10 also includes a public switch telephone network (PSTN) 26 with a PSTN gateway 28. In this exemplary illustration, the user of the non-SIP-enabled computing device 12 has access to a standard telephone 30 (connected to the PSTN 26). Other types of voice communication devices can be used to illustrate the principles of the invention, for example, a cell phone or a digital phone. In an alternate embodiment, voice communication with UserA can be done via computing device 12, which is equipped with audio capabilities (e.g. microphone, speakers, headset, etc.) instead of using telephone 30 and the PSTN 26.

In one embodiment, an application-sharing web server 32 is connected to the IP network 18-2 to enable application sharing between users. In general, the application-sharing web server 32 is a computing system, or a program executing on a computing system, that enables simultaneous access to or execution of a shared application or document by two or more users.

The computing device 12 is a representative example of one of a plurality of independently operated non-SIP-enabled computing devices that may establish a connection with the service node 14 in order to communicate with a SIP-enabled communication device, as described herein. In contrast to the non-SIP-enabled computing device 12, the communication device 16 runs SIP client software (i.e., SIP user agent), which enables its user to engage in multimedia (voice, video, data, etc.) communications over IP networks. For purposes of participating in such communications, the communication device 16 can be equipped with, for example, a headset and web camera. Although FIG. 1 shows only one SIP-enabled communication device and only one non-SIP-enabled computing device, it is to be understood that the communications network 10 can have a plurality of SIP-enabled communication devices and non-SIP-enabled computing devices independently and concurrently communicating with the service node 14.

Exemplary implementations of the computing device 12 include, but are not limited to, personal computers (PC), Macintosh computers, workstations, laptop computers, terminals, kiosks, hand-held devices, such as a personal digital assistant (PDA), mobile or cellular phones, navigation and global positioning systems, and any other Web-browser-enabled computing device with a display screen, a processor for running application programs, memory, and one or more input devices (e.g., keyboard, touch-screen, mouse, etc.). Exemplary implementation of communication device 16 include the various embodiments of computing device 12 with SIP client software, plus IP phones, wired or wireless, and with various multimedia capabilities. The computing device 12 can run any commercially available Web browser (e.g., Microsoft INTERNET EXPLORER®, Mozilla FIRE-FOX®, NETSCAPE®, and SAFARI® for executing HTML (Hypertext Markup Language) and XML (extensible Markup Language) code and for communicating with the service node 14 in accordance with the HTTP (HyperText Transport Protocol) or HTTPS (HTTP over Secure Socket Layer) protocols. The communication device 16 uses the SIP protocol or another multimedia communication protocol to provide multimedia services.

The service node 14 includes a web server (WS) component 22, a SIP UA (user agent) 24, and service logic 25. The service node 14, in general, is a computing system, or a server program executing on a computing system, for bridging multimedia communications between non-SIP-enabled computing devices and SIP-enabled communication devices, as described herein. The WS component 22 is in communication with the non-SIP-enabled computer 12 over the network 18-1. The SIP user agent 24 is in communication with one or more SIP proxies 20 over the IP network 18-2 and with the PSTN gateway 28 connected to the PSTN 26. The service logic 25, which is in communication with the WS component 22 and the SIP user agent 24, controls the operation of the service node 14 in accordance with requests and messages received from the non-SIP-enabled computing device 12 and SIP-enabled communication device 16, respectively.

The SIP proxy 20 is an intermediary server that participates in the SIP messaging for setting up a multimedia communication session between SIP-enabled computing systems (e.g., the service node 14 and communication device 16).

Figure 2:
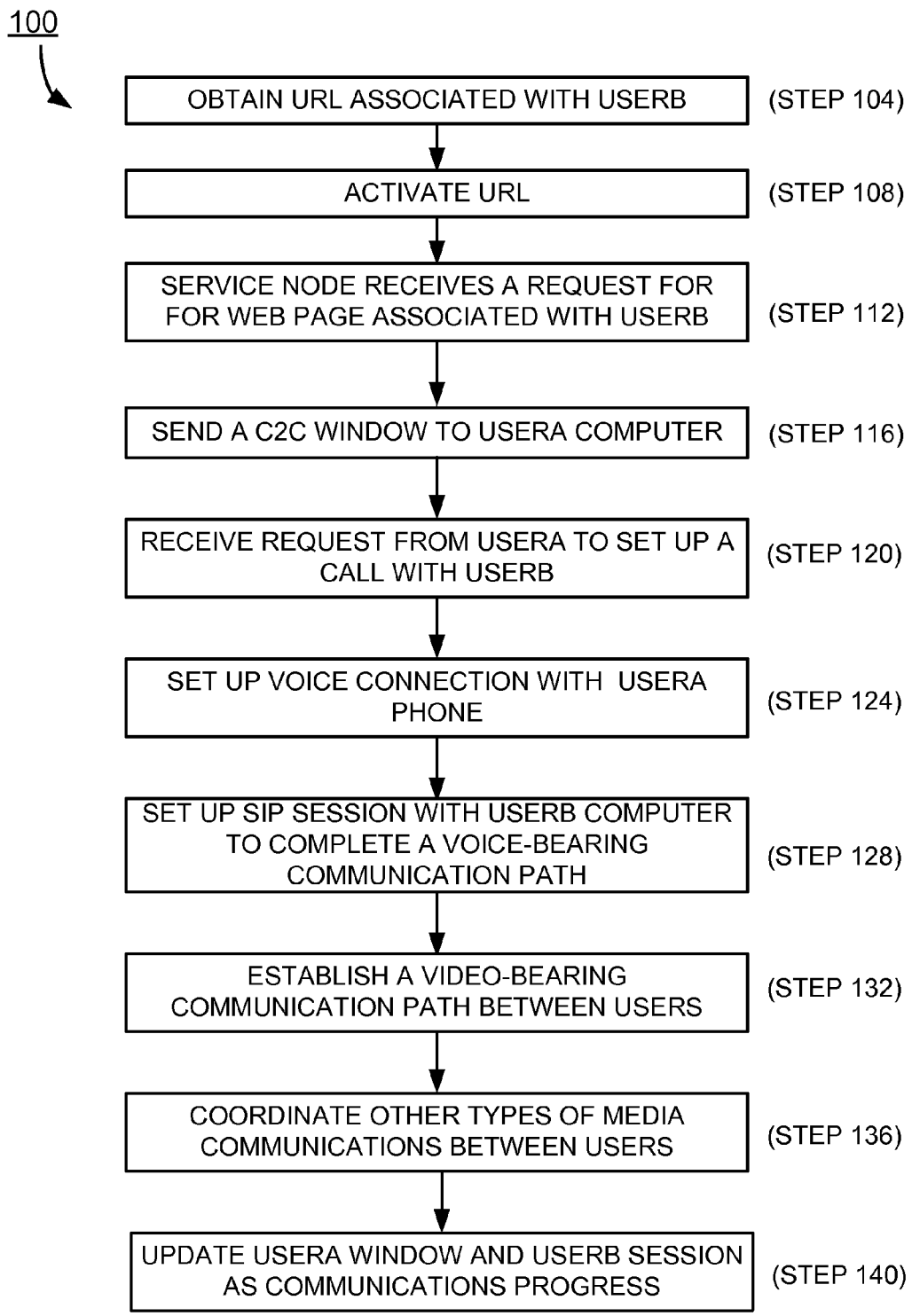
FIG. 2 is a flow diagram of an embodiment of process for establishing a communication session between a user of a non-SIP-enabled computing device and a user of a SIP-enabled communication device.

FIG. 2 provides a general overview of an exemplary process 100 for establishing multimedia communications between a user of the non-SIP-enabled computing device 12, referred to as UserA, and a user of the SIP-enabled communication device 16, referred to as UserB. In the context of this process 100, UserA is the calling party, and UserB is the called party. In the description of the process 100, reference is also made to FIG. 1.

In general, each prospective called party has one or more "personal" URLs, which callers can use to establish multimedia communications specifically with that user. At step 104, UserA obtains one such universal resource locator (URL) for establishing communications specifically with UserB. Acquisition of the URL can occur in a variety of ways. For example, UserA can obtain the URL by word of mouth (e.g., from UserB), from an email message, from an instant or chat message, from a downloaded web page, from a text message, from a video game, or from a variety of application programs. The URL points to a web page (also, web document) hosted by the server node 14.

UserA activates (step 108) the URL to initiate communications with UserB. Depending upon the manner in which UserA acquires the URL, UserA may activate the URL with a mouse click or by cutting-and-pasting or typing the URL into the address field of the browser window. Activating the URL sends a request for a web page associated with UserB to the service node 14.

At step 112, the WS component 22 of the service node 14, abbreviated as SN-WS 22, receives the request transmitted from the UserA computer 12. The request may include the SIP address of UserB. Alternatively, the service node 14 may have a table with entries that associate URLs with SIP addresses. In response to the request, the SN-WS 22 sends (step 116) a click-to-call (c2c) window to the UserA computer 12.

Figure 3:
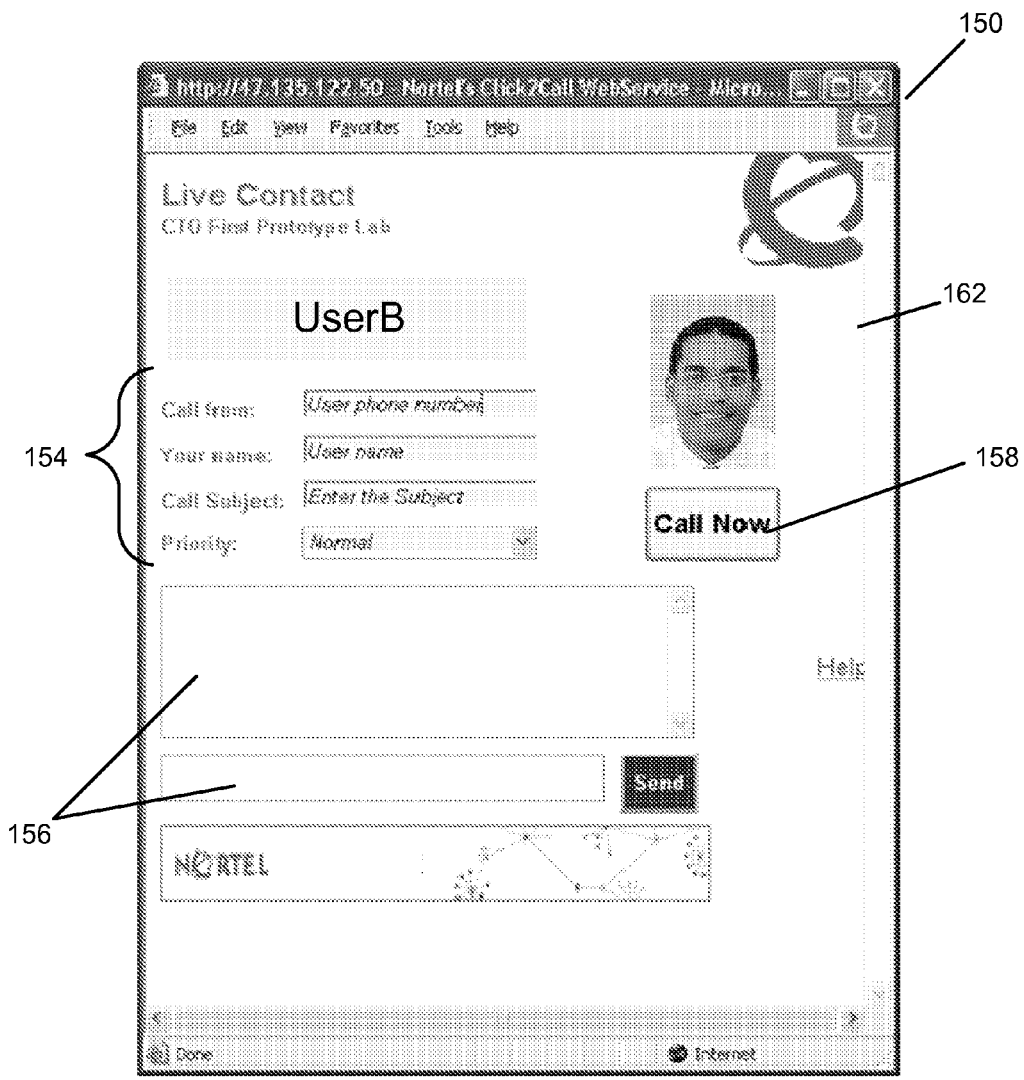
FIG. 3 is a diagram of an exemplary click-to-call window sent by the service node of FIG. 1 to the non-SIP-enabled computing device.

Referring now to FIG. 3, shown is an exemplary embodiment of a c2c window 150 that the service node 14 can send to UserA in response to activation of the UserB-associated URL. The c2c window 150 includes various fields 154 for receiving certain information to be supplied by UserA (e.g., a UserA phone number, the UserA name, topic of the call, and priority of the call). Optionally, the c2c window can also require that the caller provides a password or other form of authentication before any action takes place (not shown). The c2c window 150 also includes instant messaging fields 156, a "call now" button 158, and, optionally, an image 162 of the party being called (here, UserB).

Figure 4:
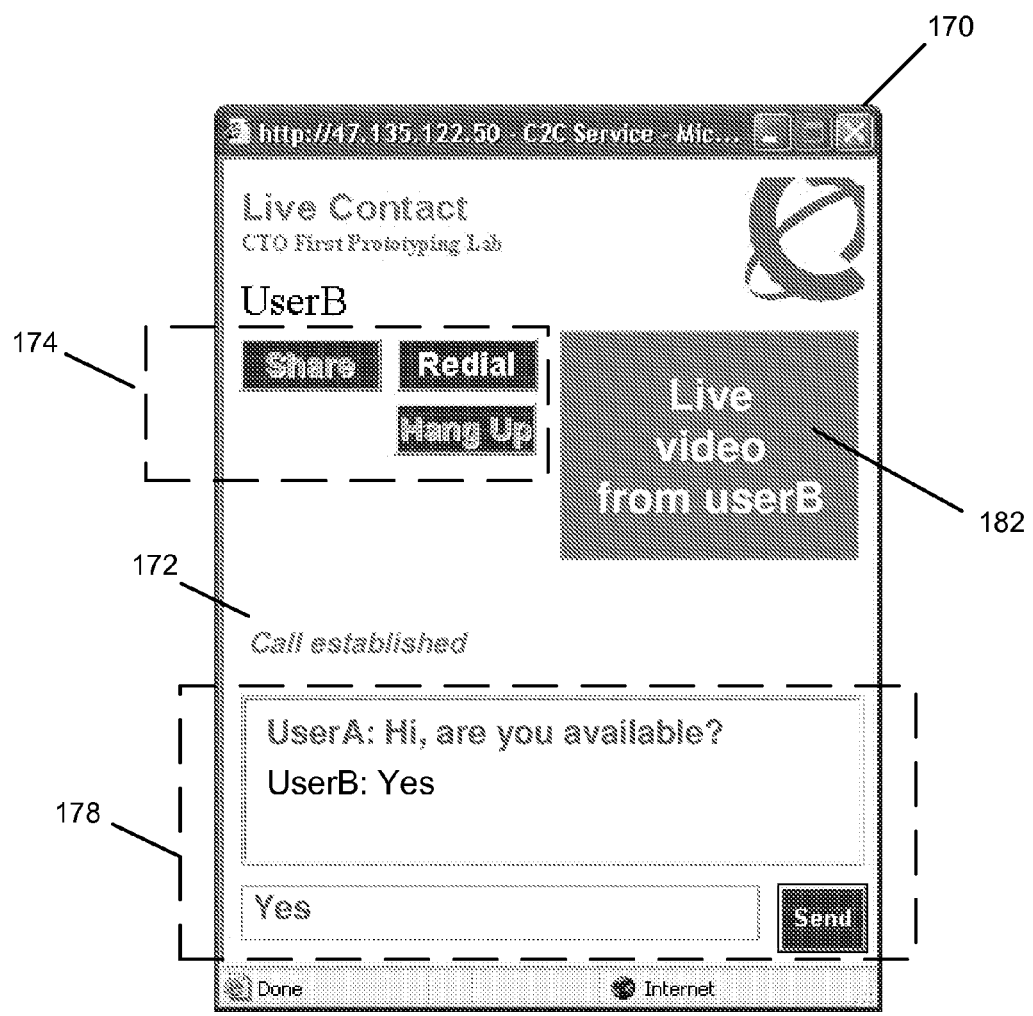
FIG. 4 is a diagram of an exemplary updated window sent by the service node to the non-SIP-enabled computing device after setting up a voice connection between a voice communication device and the SIP-enabled communication device.

Some of the information may automatically appear in the fields 154 of the c2c window 150, for example, by a cookie or an auto-fill feature of the UserA web browser. Entry of some information, such as the phone number, may be required for a successful set up of a communication session. For example, if c2c window 150 appears without an automatically supplied phone number, UserA needs to enter the phone number in the field provided before initiating the call by clicking on the "call now" button 158. Although not shown, the c2c window 150 can also provide an online presence status of UserB and have fields for engaging in instant messaging (e.g., as shown in FIG. 4). Instant messaging can take place before or at the time of setting up the communication session.

Referring back to FIG. 2, after UserA clicks on the "call now" button 158, the service node 14 receives (step 120) a request to set up the call from the UserA computer 12. The request includes a phone number (herein referred to as DN1—directory number 1—at which UserA may be reached (i.e., telephone 30). In response to this request, the service node 14 sets up (step 124) a voice connection with the telephone 30 through the PSTN gateway 28. The service node 14 selects a PSTN gateway based on the particular telephone number (e.g., selecting the PSTN gateway geographically closest to the telephone 30).

Subsequent to or concurrent with establishing the voice connection with the UserA telephone 30 through the PSTN 28, the service node 14 sets up (step 128) an SIP session with the communication device 16 of UserB. Establishing the SIP session completes the voice connection, that is, a voice-bearing communication path now exists between the UserA telephone and the UserB communication device 16.

Concurrent with or subsequent to establishing this voice-bearing communication path, the service node 14 may also establish (step 132) a video-bearing communication path between the users. If the UserA computer 12 has video-streaming capability (i.e., a browser plug-in and camera), UserA can receive video from and send video to UserB. To achieve the exchange of video, the service node 14 can open a video streaming window within a window displayed on the UserA computer 12, accept video requests, and route the video from UserB to that window.

FIG. 4 shows an example of a window 170 that the service node 14 can send to the UserA computer 12 after establishing the voice connection. The window 170 includes a call status indicator 172 (e.g., call established) and a plurality of buttons 174 for performing certain functions. One button, called Share, launches an application-sharing program. Another button, called Hang Up, terminates the voice-bearing communication path (and the video-bearing communication path, if any) between the users. The window 170 also includes instant messaging fields 178 for exchanging text messages with UserB and a video section 182 for playing video streamed from UserB.

Referring back to FIG. 2, the users can also engage (step 136) in other types of communications, through the service node 14, such as co-browsing documents and pictures, instant messaging, application sharing, and data transfers. As the multimedia communication session progresses, the service node 14 updates (step 140) the window 170 at the computer 12 of UserA and the session at the communication device 16 of UserB. After the real-time communications terminate (i.e., the voice and video communication session), the users can continue to communicate through the service node 14 to exchange instant messages, documents, and pictures, and to co-browse the Internet.

Figure 5A:
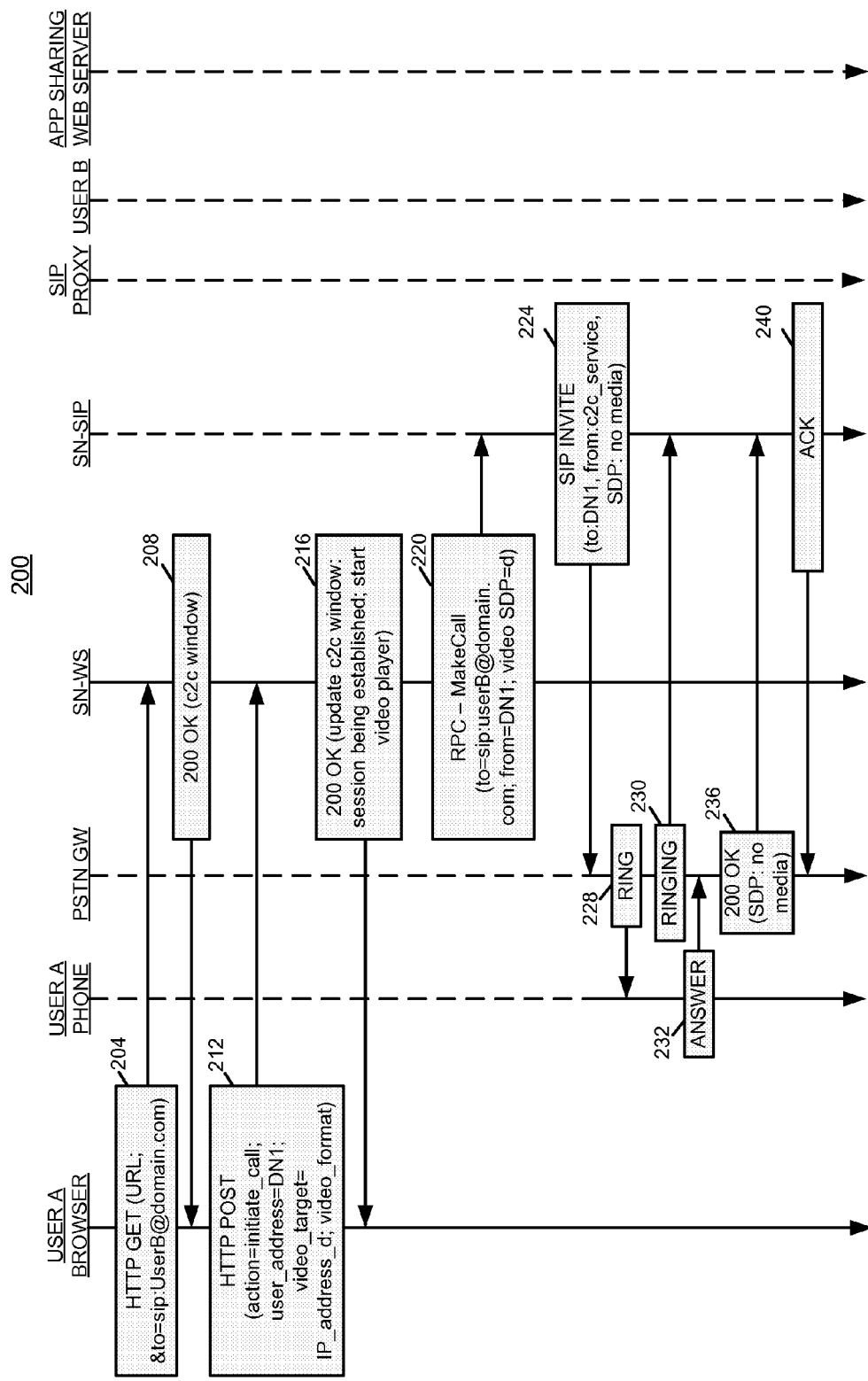
FIG. 5A and FIG. 5B comprise a sequence diagram of an embodiment of a process for establishing multimedia communications between a user of a non-SIP-enabled computing device and user of a SIP-enabled communication device.
Figure 5B:
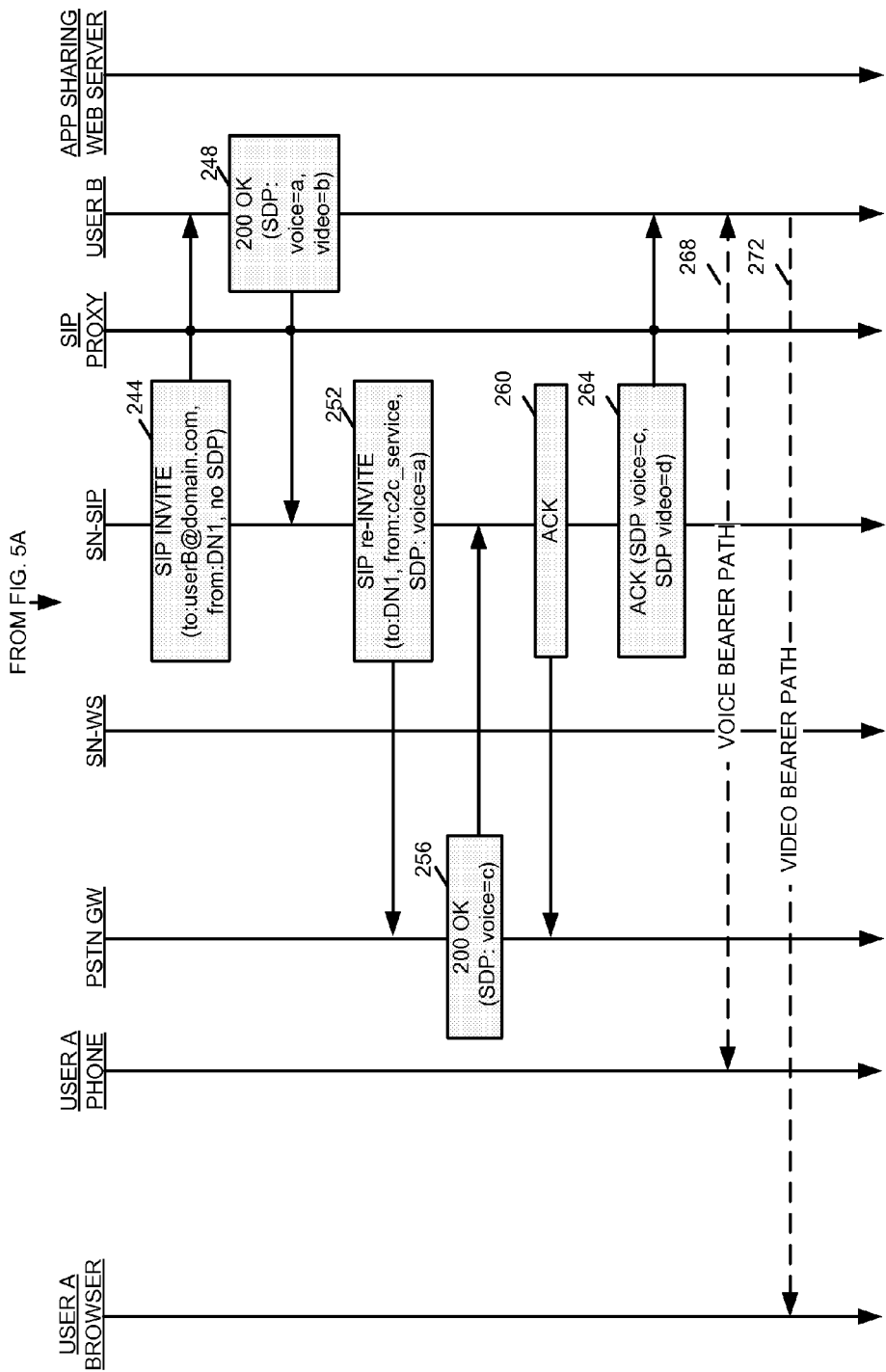

FIG. 5A and FIG. 5B shows an embodiment of a process 200 for establishing and conducting a multimedia communication session between non-SIP-enabled UserA and SIP-enabled UserB. Not every message exchanged among the various communications equipment is shown. In the description of the process 200, reference is also made to elements shown in FIG. 1, FIG. 3, and FIG. 4.

Referring now to FIG. 5A, the UserA computer 12 sends (step 204) an HTTP Get request to the SN-WS 22 (i.e., UserA has activated a UserB URL). In this example, the request includes the SIP address of UserB (userB@domain.com). The SN-WS 22 sends (step 208) a reply to the UserA computer 12 with the HTTP success status code (200 OK) and with the c2c window 150.

When UserA clicks on the "call now" button 158, the UserA computer 12 sends (step 212) an HTTP post message to the SN-WS 22. Passed parameters of the HTTP post message include an action (initiate_call), UserA's submitted phone number (DN1), an address of the video target (IP_Address_d), and the video format. (In this example, the browser executing at the computer 12 has an installed video plugin for a video player capable of receiving and playing streaming video.) The SN-WS 22 replies (step 216) with a "200 OK" status code, with a window 170 (i.e., an update to the c2c window 150) indicating that the session is being established, and with a command to launch the video player at the UserA computer 12.

At step 220, the SN-WS 22 sends an RPC (remote procedure call) to the SN-SIP user agent 24. The method invoked by the RPC is MakeCall. Information passed with the RPC includes the SIP address of UserB (userB@domain.com), the address of the sender, namely, UserA (DN1), and the session description protocol (SDP) for video. SDP is a protocol for identifying initialization parameters for streaming media during the communication session (e.g., what IP ports to use, the codec being used, etc.). In FIG. 5A, the letter "d" summarizes the identified initialization parameters.

At step 224, the SN-SIP user agent 24, in response to the RPC, initiates a call to the UserA telephone 30 by sending an SIP Invite message to the PSTN gateway 28. The message includes parameters such as the address of the message sender (service node, here called "c2c_service"), the address of the destination, namely, UserA (DN1), and SDP parameters, here indicating there is no media.

The PSTN gateway 28 rings (step 228) the UserA telephone 30 and sends (step 230) a ringing tone to the SN-SIP user agent 24. When UserA answers (step 232), the PSTN gateway 28 sends (step 236) a "200 OK" message back to the SN-SIP user agent 24. At step 240, the SN-SIP user agent 24 acknowledges receipt of the "200 OK" message. Accordingly, the UserA portion of the voice connection is established.

Referring now to FIG. 5B, the SN-SIP user agent 24 sends (step 244) a SIP Invite message to the UserB communication device 16. The SN-SIP user agent 24 can send this message in parallel to establishing a voice connection to the UserA telephone or after receiving the OK message from the PSTN gateway 28 indicating that the voice connection has been established. The message passes through the SIP proxy 20 (as signified by the black dot where the arrow crosses the SIP proxy column). In response to the message, the SIP client at the UserB communication device 16 sends (step 248) a "200 OK" message. SDP information accompanying the "200 OK" message includes voice parameters (summarized by the letter "a") and video parameters (summarized by the letter "b") for the UserB communication device 16. The reply from the UserB communication device 16 passes through the SIP proxy 20 to the service node 14.

In response, the SN-SIP user agent 24, at step 252, sends a SIP re-Invite message to the PSTN gateway 28, this time with the SDP parameters (a) for the voice media. The PSTN gateway 28 responds to the SN-SIP user agent 24 with a "200 OK" message bearing SDP information with voice parameters, summarized by the letter "c", associated with the PSTN gateway 28 connecting with the UserA phone 30 via the PSTN 26.

Upon receipt of this "200 OK" message, the SN-SIP user agent 24 sends (step 260) an acknowledgement to the PSTN gateway 28 and sends (step 264) an acknowledgment to the UserB—which again passes through the SIP proxy 20. The acknowledgement sent to UserB supplies the voice parameters (c) and the video parameters (d) required by the UserA telephone 30 and computer 12. At this stage, UserA and UserB are engaged in multimedia communications through a voice bearer path 268 existing between the UserA's telephone 30 and UserB's client system 16 and a unidirectional video bearer path 272 existing to UserA's computer 12 from UserB's communication device 16. Additional steps (not shown) can be performed to initiate video transmission from UserA to UserB, if UserA computer supported a video webcam.

Figure 6:
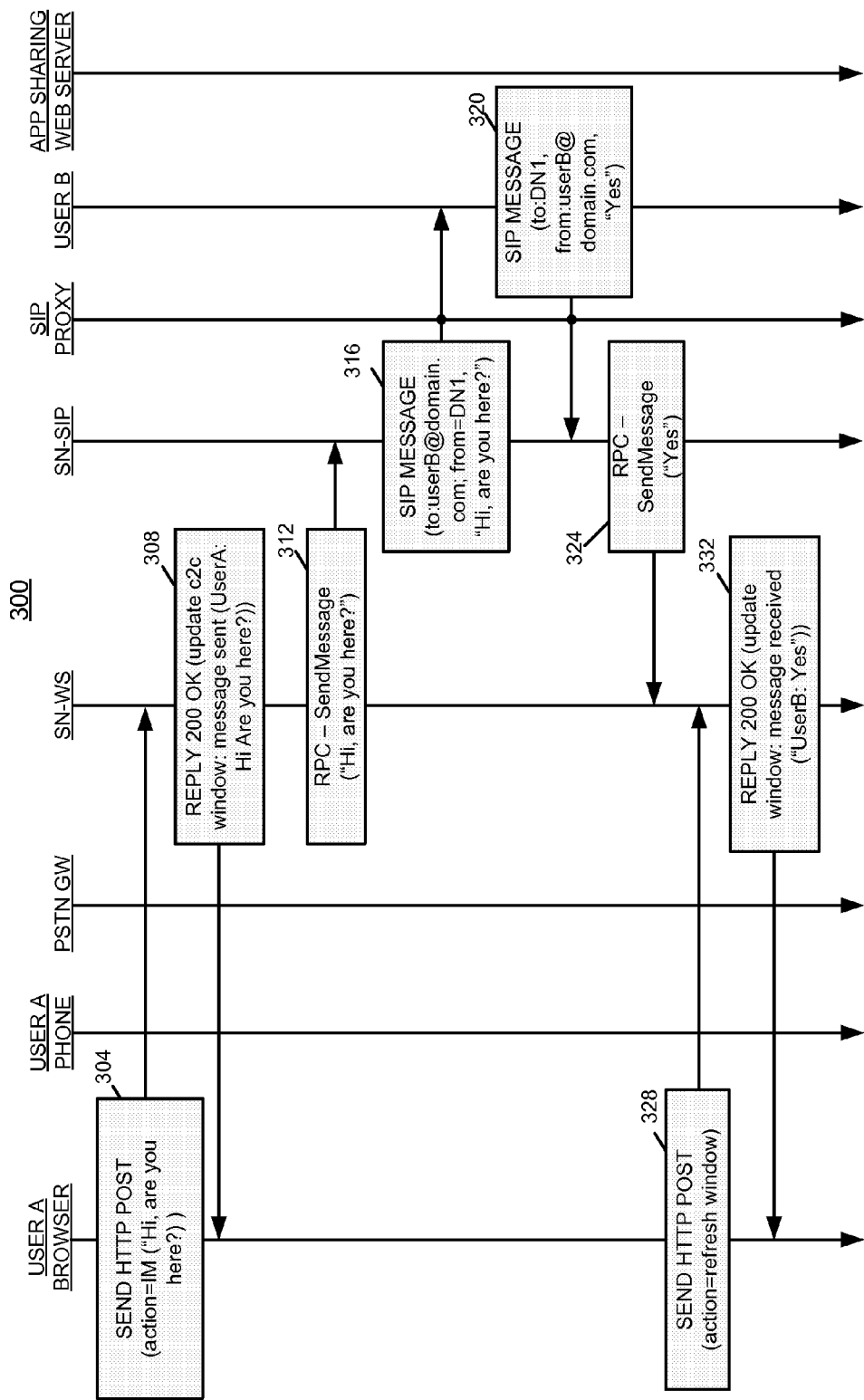
FIG. 6 is a sequence diagram of an embodiment of a process for conducting instant messaging between the non-SIP-enabled computing device and the SIP-enabled communication device.

FIG. 6 shows an embodiment of a process 300 for conducting instant messaging between the non-SIP-enabled UserA computer 12 and the SIP-enabled UserB communication device 16. The users can exchange instant messages before the establishment of, during, or after the termination of the real-time multimedia communication session established as described in connection with FIG. 5A and FIG. 5B. Although UserA is described here as the initiator, either of the two users can initiate instant messaging. Not every message communicated among the devices is shown.

FIG. 6 illustrates the scenario where a communication session is already in place between UserA and UserB as illustrated in FIG. 5. When UserA clicks on the "Send" button within the window 170 to transmit an instant message, the UserA browser sends (step 304) an HTTP Post message to the SN-WS 22. The Post message identifies an action, here, for example, to send the instant message "Hi, are you here?" The SN-WS 22 replies (step 308) with a "200 OK" message, including an update to the window 170 appearing in the browser at the UserA computer 12. The update includes the message sent by UserA. The message appears in the appropriate field 178 in the window 170.

In addition, under the directional control of the service logic 25, the SN-WS 22 sends (step 312) a remote procedure call, called SendMessage, to the SN SIP component 24. This RPC includes the message from UserA as a passed parameter. In response to this RPC, the SN-SIP user agent 24 sends (step 316) a SIP Message to the SIP user agent running at the UserB communication device 16. The SIP Message includes the SIP address of the UserB communication device 16, the phone number of the sender (namely, DN1), and the message content "Hi, are you here?". Alternatively, sender name can be used instead or in addition to the sender phone number. When UserB submits the answer "Yes", the UserB communication device 16 sends (step 320) a SIP Message back to the SN-SIP user agent 24, with the message content "Yes". In response to the reply from the UserB communication device 16, the SN-SIP user agent 24 sends (step 324) a SendMessage RPC to the SN-WS 22, by which the message content "Yes" is forwarded.

Periodically, for example, once every second, the UserA computer 12 sends (step 328) an HTTP post message to the SN-WS 22 requesting a refresh of the window 170. When the SN-WS 22 receives one such HTTP post message—after having previously received the SendMessage RPC from the SN-SIP user agent 24—the SN-WS 22 sends (step 332) a "200 OK" message to the UserA browser with an updated window 170 that includes the received message "UserB: Yes".

Figure 7:
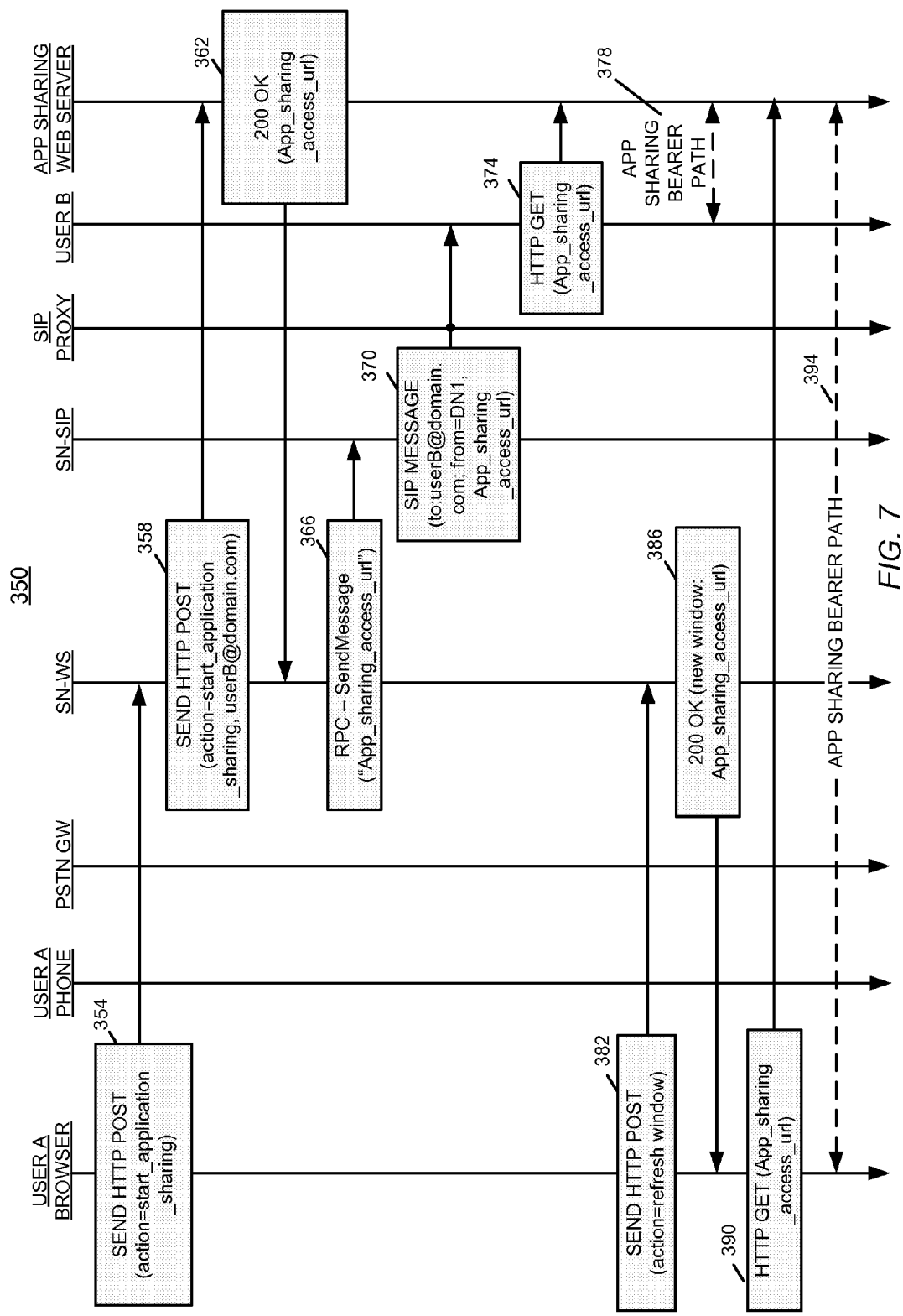
FIG. 7 is a sequence diagram of an embodiment of a process for cooperating in application sharing by the non-SIP-enabled computing device and the SIP-enabled communication device.

FIG. 7 shows an embodiment of a process 350 for conducting application sharing by the non-SIP-enabled UserA computer 12 and the SIP-enabled UserB communication device 16 during an existing multimedia communication session. Although not illustrated in FIG. 7, the users can participate in application sharing before the establishment of or after the termination of the multimedia communication session described in connection with FIG. 5A and FIG. 5B. Either of the two users can initiate application sharing, although UserA is described here as the initiator. Again, not every message exchanged among the various devices is shown.

When UserA clicks on the "Share" button in window 170, the browser running at the UserA computer 12 issues (step 354) an HTTP Post message to the service node 14, requesting the start of application sharing. In response to the UserA request, under the directional control of the service logic 25, the SN-WS 22 sends (step 358) an HTTP Post message to the application-sharing web server 32 (FIG. 1). This Post message requests the start of application sharing and includes the SIP address of UserB. The application-sharing web server 32 responds (step 362) with a "200 OK" message, including a URL (App_sharing_access_url) for accessing the application to be shared at the application-sharing web server 32.

Upon receiving the application sharing URL, the SN-WS 22 sends (step 366) a SendMessage RPC to the SN-SIP user agent 24. The RPC includes this application sharing URL. The SN-SIP user agent 24 sends (step 370) a SIP Message to the UserB communication device 16, including the application sharing URL and identifying the application-sharing participants, namely, DN1 and userB@domain.com.

In response to the SIP Message from the service node 14, the UserB browser sends (step 374) an HTTP GET message addressed to the application-sharing URL. In response, the application-sharing web server 32 establishes (step 378) an application-sharing bearer path between the application-sharing web server 32 and the browser running at the UserB communication device 16.

Meanwhile, the browser at the UserA computer 12 periodically sends (step 382) an HTTP Post message to the SN-WS 22 requesting a refresh of the window 170. When the SN-WS 22 receives one such HTTP post message—after receiving the application-sharing URL from the application-sharing web server 32, the SN-WS 22 sends (step 386) a "200 OK" message to the UserA browser with a new window that includes the application-sharing URL. When UserA activates this URL, the UserA browser sends (step 390) an HTTP Get message directed to this application-sharing access URL. Upon receiving this Get message, the application-sharing web server 32 establishes an application-sharing bearer path 394 between the UserA computer 12 and the application sharing web server 32. Accordingly, both UserA and UserB have established application-sharing bearer paths 378, 394 with the application-sharing web server 32 and can now jointly participate in application sharing.

In some embodiments, communications networks also enable calling parties to determine the current availability of a specified prospective called party and a most appropriate means by which to communicate with that person. In these embodiments, the service node collects status information for the prospective called party from various sources and presents this information in a web page transmitted to an inquiring caller. The status information can include whether the called party is on the telephone, has an active online presence, and is scheduled for a meeting. The physical location of the called party can also be part of the collected status information. The web page also lists one or more means by which the inquiring caller can initiate communication with the called party. The listing of such means can appear in a preferential order as defined by the called party. When the caller selects one of the communication means, the service node establishes the communications between the parties.

Figure 8:
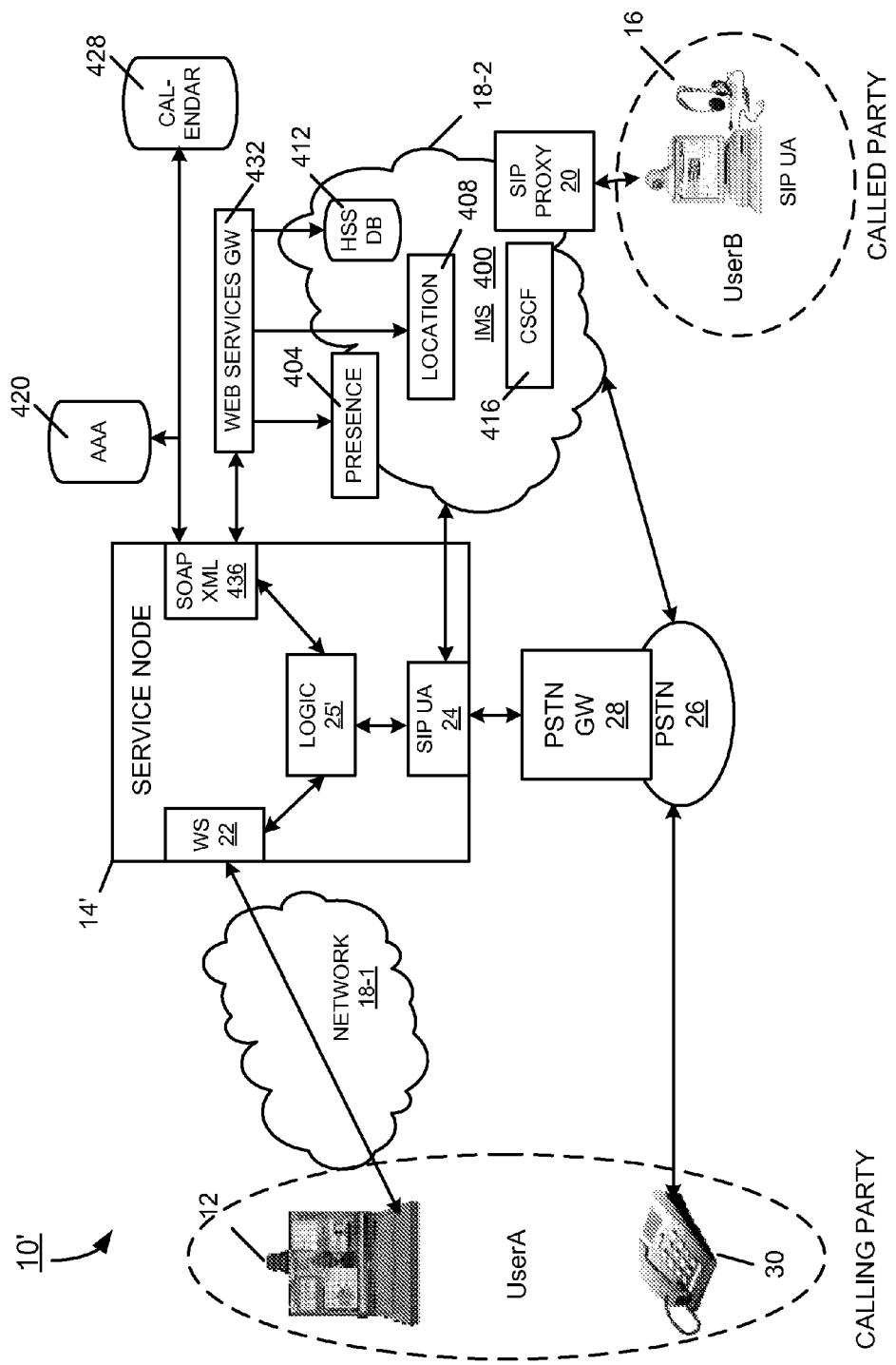
FIG. 8 is a diagram of another embodiment of a communications network including a service node for collecting status information about prospective called parties.

FIG. 8 shows an embodiment of the communications network 10' in which users are able to access a web portal associated with a prospective called party over a network for purposes of obtaining status information about the called party and for determining an appropriate way to establish communications with the called party. The communications network 10' includes the UserA computer 12 in communication with a service node 14' over the network 18-1 and the UserB communication device 16 in communication with the service node 14' over the IP network 18-2. Although FIG. 8 shows UserA to be non-SIP-enabled and UserB to be SIP enabled, either or both UserA and UserB can be non-SIP-enabled or SIP-enabled.

Advantageously, the UserB communication device 16 does not require special client software in order to have an integrated web portal made available, as described herein, and, aside from a standard web browser, the UserA computer 12 does not need special client software in order to access UserB's web portal. In addition, UserA does not require an account or a password (except, perhaps, to obtain certain secure information) to access UserB's web portal, or to be enabled on a presence friends list. To access a given prospective called party's web portal, UserA need only have a personal URL of that called party.

UserB can have more than one personal URL. Multiple URLs can provide different levels of access to UserB information. For example, a first URL can be for general public use, allowing for the collection of less sensitive status information, and a second URL, difficult to guess arbitrarily and reserved for friends and family, can be for enabling access to private, more closely guarded information. UserA can acquire a personal URL of UserB in a one of the variety of ways previously described. Each URL points to a web page (i.e., integrated web portal) hosted by the server node 14.

In this embodiment, the IP network 18-2 includes an IP Multimedia Subsystem (IMS) network 400. The IMS network 400 includes a presence server 404, a location server 408, an HSS (home subscriber subsystem) database 412, and a CSCF (call session control function) server 416.

The presence server 404 collects, manages, and distributes real-time information regarding a user's availability, such as whether the user is using a given communication device (e.g., computer, a telephone) at a particular time, and communications capability, such as whether web collaboration or video conferencing is enabled. The location server 408 maintains a database of real-time locations of users and their communication devices. The HSS database 412 holds user-profile information used to the support, establish, and maintain calls and sessions made by users. This profile information includes a user's security variables and physical location information. The CSCF server 416 is a SIP server that interacts with the network databases, for example, the HSS database 412 for tracking user mobility and security profiles. The AAA database 420 maintains user information for confirming the identity of users requesting services and for granting authorization of specific types of services to users.

The communications network 10' also includes a calendar 428. The calendar database 428 maintains daily- and hourly-based calendar entries of individual users. The database 420 and calendar 428 can be part of the IP network 18-2 or of a private (enterprise) network (e.g., FIG. 12).

In addition to the SN-WS 22 (for serving web pages to web browsers) and the SN-SIP user agent 24 (for setting up communication sessions, and, optionally, for collecting status information about a user to be called), the service node 14 includes service logic 25' and may include a SOAP (Simple Object Access Protocol) XML component 436 or similar protocols. Generally, SOAP is an XML-based protocol that enables applications to exchange information using HTTP (i.e., for accessing a web service). The SOAP XML component 436 is in communication with different servers for collecting status information about a user. In one embodiment, the SOAP XML component 436 is in communication with the AAA database 420, the policies database 424, the calendar 428, and a web services gateway 432. Through the web services gateway 432, the SOAP XML component 436 can also communicate with the presence and location servers 404, 408 and with the HSS database 412.

Figure 9:
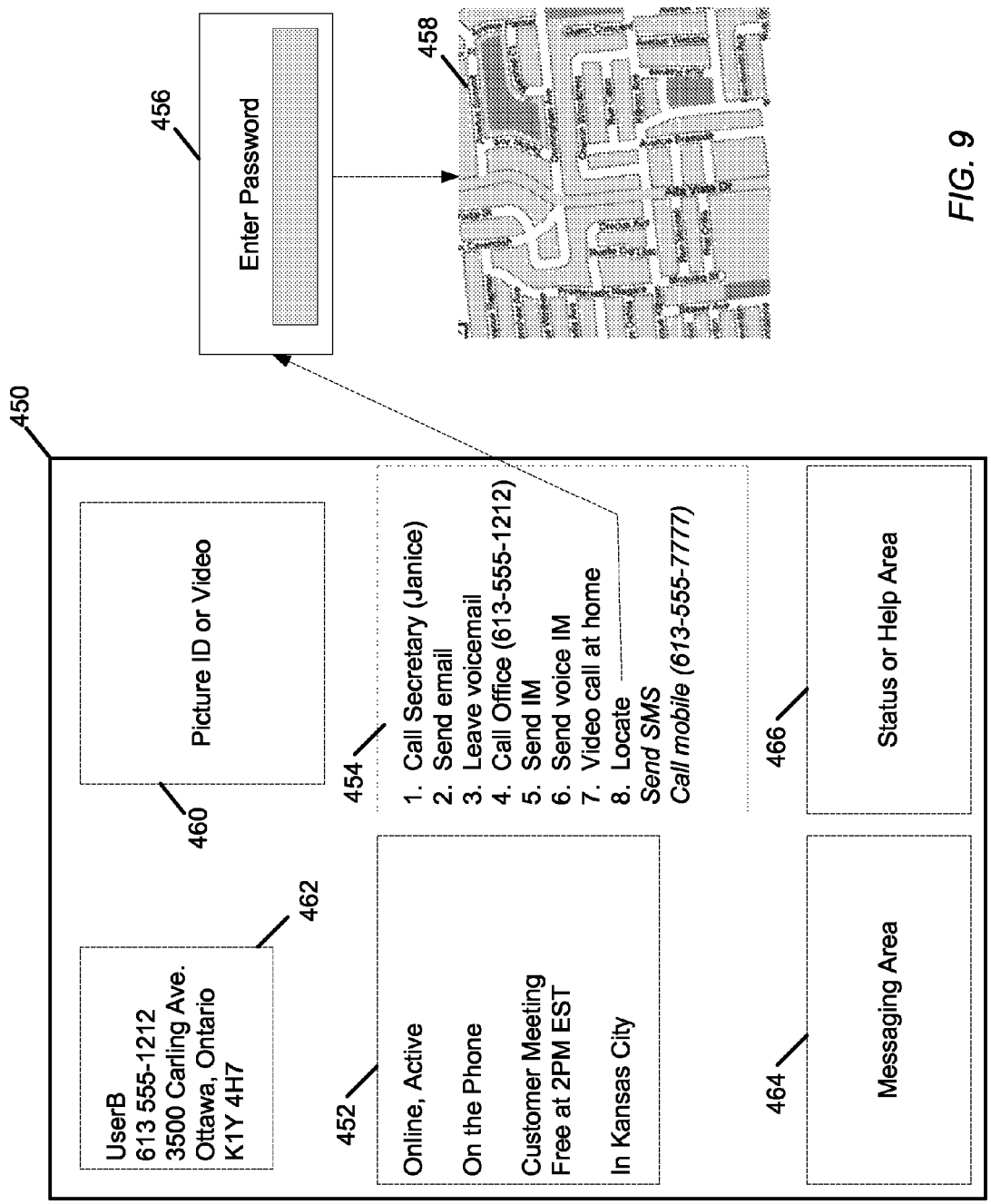
FIG. 9 is a diagram of an exemplary click-to-call window associated with a prospective called party, the service node of FIG. 8 sending the window to the computer of a calling party upon request.

FIG. 9 shows an embodiment of an integrated web portal 500 transmitted to a calling party (e.g., UserA) in response to activation of a URL associated with a user to be called (e.g., UserB). The size and content of the web portal 450 may adjust appropriately for different browser capabilities of the various communication devices (e.g., computer, PDA, cell phone) that may be used by a calling user.

In general, the web portal 450 presents various status information 452 about the party to be called (UserB) and communication options 454 for attempting to establish communications with the called party. As an example, the status information 452 appears on the left side of the web portal 452. In one embodiment, the status information 452 includes calendar information, presence status, and location status of the user to be called. Here, the presence status indicates whether UserB is online (and, if so, whether active) and whether UserB is on the telephone.

On a right side of the web portal 450 is a menu of the communication options 454 for contacting UserB based on the presented status information 452. The particular communication options 454 displayed in the menu can depend upon the identity of the user trying to reach UserB, upon the particular URL activated by UserA, or upon a combination thereof. In addition, the availability of a particular communication option may be conditional. For example, if UserB is not on the computer (e.g., the computer is off), there is no reason to display an option to communicate with UserB by instant messaging. In one embodiment, the communication options 454 appear in the menu in a ranked order as determined by UserB. UserB determines (i.e., provisions) the policies that control which status information and which communication options are presented, and their ranked order, to the inquiring caller. Such policies can be maintained in a database accessible to the service logic 25' when preparing the web portal 450 for delivery to the UserA computer.

Some communication options 454 may be "grayed" out to indicate that these mechanisms are not currently available for establishing contact with the called party. In FIG. 9, examples of such grayed-out options are italicized, namely, "Send SMS" and "Call mobile". Other communication options can require an additional level of security. For example, the calling party may need to enter a password in order to use the "locate" communications option (rank #8). Upon selecting the locate option, the calling user enters a password in a pop-up field 456, and a map location 458 corresponding to the present geographical location of the user appears in the web portal 450.

In addition, the web portal 450 can display a picture ID 460 (or video region) and a Vcard (electronic business or personal card) 462 of the user being called. The web portal 450 can also provide a messaging area 464 by which the calling user can send instant messages to the called user and a help region 466 by which the calling user can obtain instructions regarding the web portal 450

In accordance with the communication options 454 shown in FIG. 9, after receiving the web portal 450, the calling user can: (1) initiate communication with an alternate contact (e.g., an administrator, delegate); (2) send an email message to the called user; (3) leave a voicemail for the called party; (4) initiate a call to a contact telephone number of the called user; (5) initiate an instant messaging session with the called party; (6) record and send a voice instant message to the called party; (7) initiate a video session with the called party; or (8) locate the called user. Although not shown, other communication options include, but are not limited to, requesting an alert if the status of the called user changes (e.g., hangs up the phone, goes online), and sending a document, image, or URL to the called user.

Figure 10:
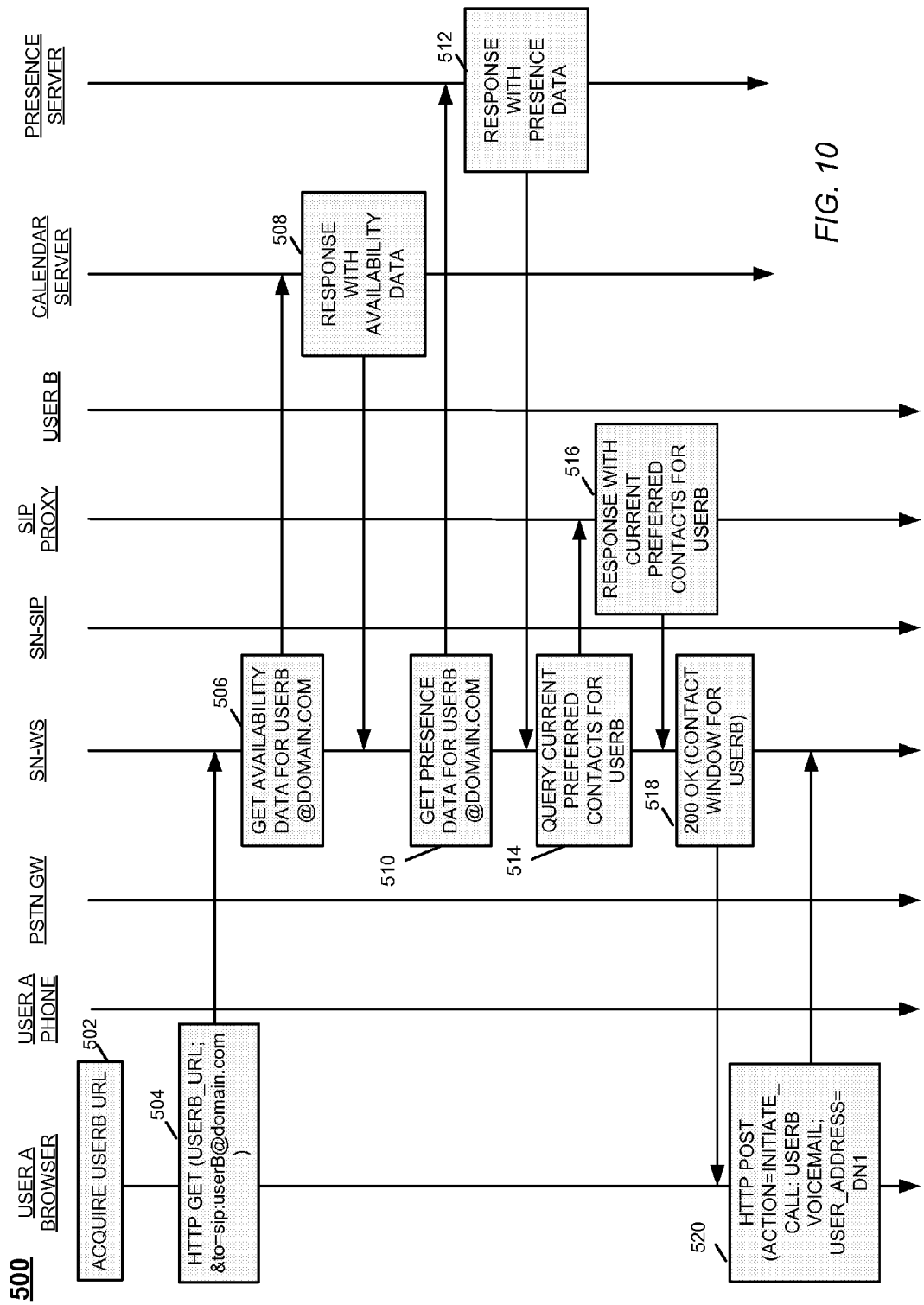
FIG. 10 is a sequence diagram of an embodiment of a process for presenting, to a calling party, status information collected for a prospective called party and communication options for reaching the called party.

FIG. 10 shows a sequence diagram of an embodiment of a process 500 for presenting an integrated web portal (e.g., web portal 450) from which a calling user can discern the current availability of prospective called party and select an appropriate means for initiating communications with that party. In the description of the process 500, reference is also made to FIG. 8 and to FIG. 9. Not every message exchanged by the various equipment are shown.

At step 502, UserA acquires a personal URL of UserB. Through a web browser, UserA activates the URL, which sends (step 504) an HTTP Get request for a web portal to the SN-WS 22. In response to this request, the service node 14 dynamically communicates with the various online databases and web services (through the gateway 432) to collect status information about UserB and to identify communications options for reaching UserB. In other embodiments, the service node 14 can periodically collect the status information for called parties beforehand, to have such status information already available when a request for a specified web portal arrives from a calling user.

As described previously, the particular information collected and communications options presented can be conditional: for example, depending upon which URL is used to access the web portal, upon the identity of the calling user, or upon the availability or presence status of the called user.

Consider, for example, that UserA has clicked on a UserB URL that permits the collection of availability and presence data. Upon receipt of the Get request, the SN-WS 22 sends a request (step 506) to acquire availability data from the calendar server 428, another request (step 510) to acquire presence data from the presence server 404, and a query (step 514) to the SIP proxy 20 to obtain preferred contacts for UserB. The calendar and presence servers 428, 404 reply (steps 508, 512) with availability data and presence data, respectfully, and the SIP proxy 20 responds (step 516) with the preferred contacts of UserB.

With the collected information, the service node 14', under the directional control of the service logic 25', constructs and sends (step 518) the web portal (e.g., web portal 450) to the UserA computer 12 (as part of a "200 OK" response to the initial HTTP Get request). In the construction of the web portal, the service node 14 ranks the communications options in accordance with a policy established by UserB.

The web portal displays within a web browser window on the UserA computer 12. From the status information, UserA can determine UserB's current online and telephone presence and calendar schedule. UserA can also determine from the list of communications options UserB's most preferred means for communicating with UserB. When UserA selects one of the communications options, the service node 14 establishes the particular form of communication between UserA and UserB.

Selection of any one of the communication options causes the UserA computer 12 to send an HTTP Post request, specifying the corresponding action, to the SN-WS 22. In this example, UserA chooses to leave a voicemail with UserB (e.g., by selecting communications option no. 3). Accordingly, the UserA browser sends (step 520) an HTTP Get request to the SN-WS 22, specifying that the selected action is to initiate a call to the UserB voicemail, and providing the UserA address (DN1). After receiving this request, the service node 14 establishes the selected communication between the communication devices of UserA and UserB (e.g., by communicating with the PSTN GW 28).

Figure 11:
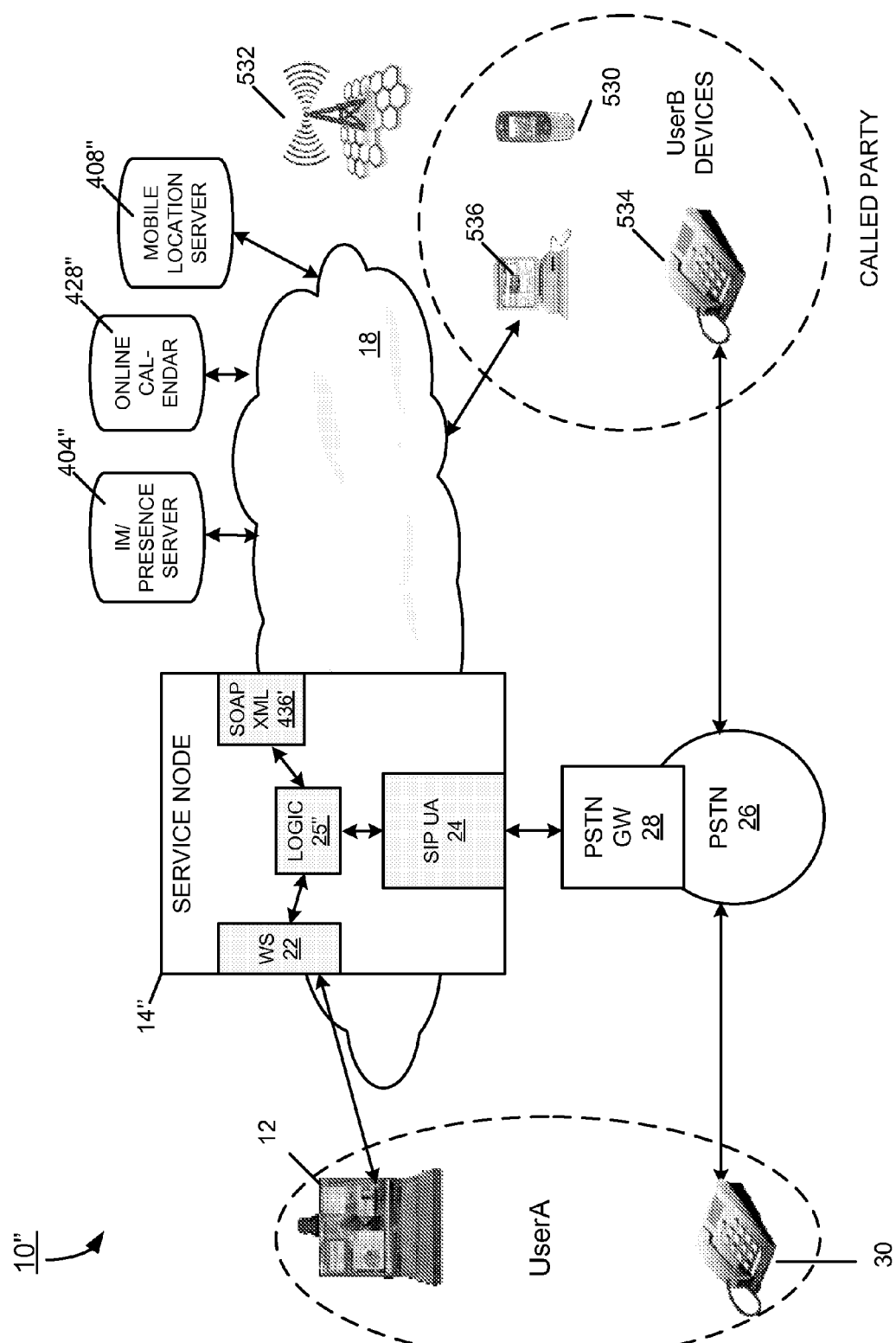
FIG. 11 is a diagram of another embodiment of a communications network including a called party who uses various legacy telephony communication devices.

FIG. 11 shows another embodiment of a communications network 10" in which a service node 14" provides integrated web portals to users over a network 18. In this embodiment, UserB has various non-SIP-enabled communication devices: a cell phone 530 through a cell tower 532; a standard telephone 534 through the PSTN 26; and a legacy computer 536 connected via the network 18. Similar to the service node 14' in the communications networks 10' of FIG. 8, the service node 14" of the communications network 10" produces integrated web portals for prospective called parties by collecting presence, calendar, and location information from the presence, calendar, and location servers 404", 408", 428" connected to the network 18. Briefly, based on user-established policies, the service node 14" determines and ranks the communication options, prepares the web portal with collected status information and the ranked communication options, and sends the web portal to a requesting caller.

Figure 12:
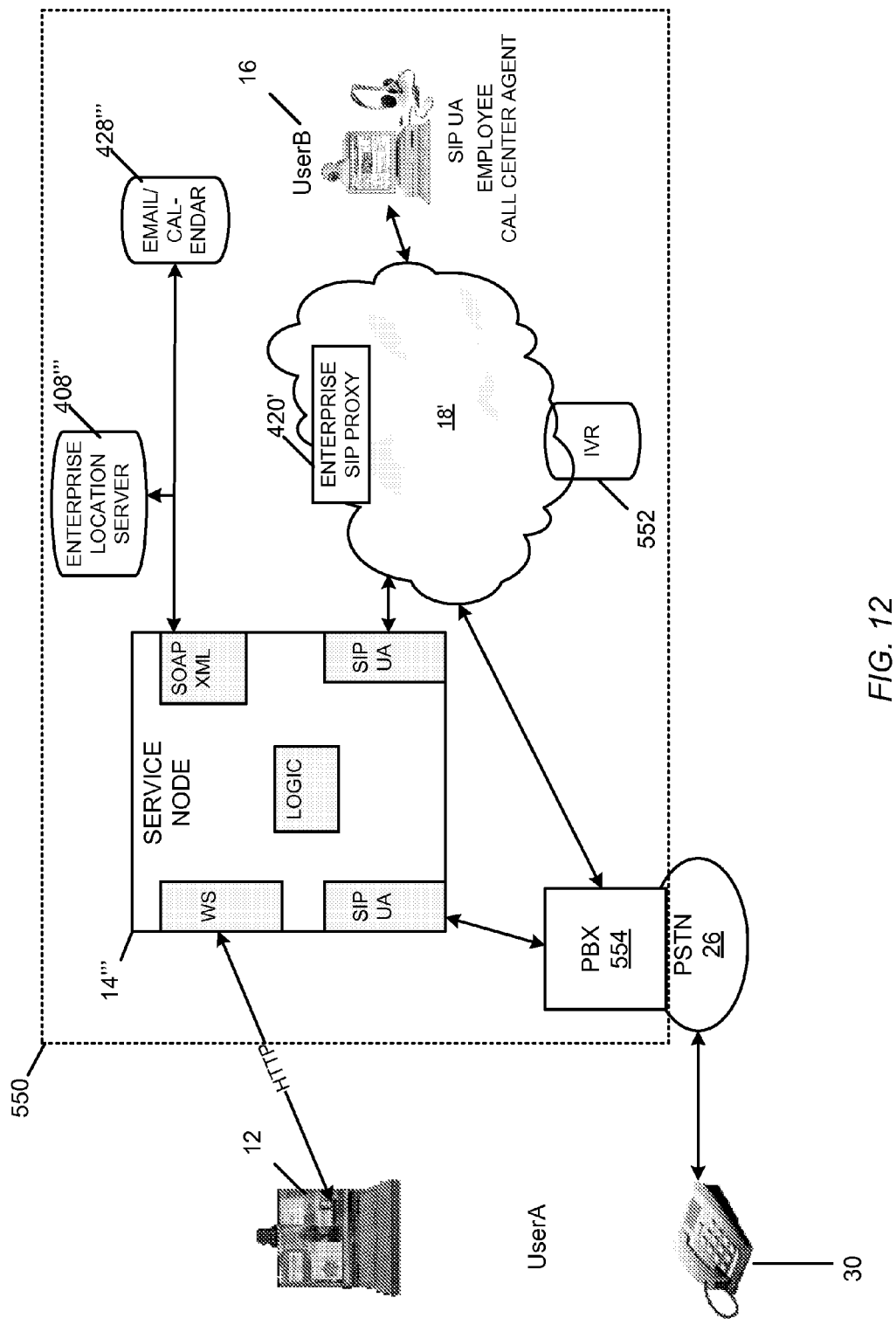
FIG. 12 is a diagram of another embodiment of a communications network in which the service node and called party are part of an enterprise network.

FIG. 12 shows another embodiment of a communications network 10''' including an enterprise network 550. The enterprise network 550 includes a service node 14''' in communication with an enterprise location server 408''', a calendar server 28''' and an IP network 18'. The IP network 18'' includes an enterprise SIP proxy 20''' and an IVR (interactive voice response) server 552. In such an enterprise network 550, the called party can be an employee or a call center agent of the enterprise who uses a SIP-enabled communication device 16. The enterprise network 550 also includes a PBX (private branch exchange) 554 for interfacing the PSTN 26.

Similar to embodiments of service nodes previously described, the service node 14''' sends an integrated web portal for communicating with the call center agent to callers (e.g., UserA) attempting to communicate with someone within the enterprise. To produce web portals, the service node 14''' collects calendar and location information from the calendar and location servers 428''', 408''', respectively. The service node 14''' determines and ranks communication options, which can include being connected to the IVR server 552, prepares the web portal with collected status information and the ranked communication options, and sends the web portal to a requesting caller.

In some embodiments, communications networks also permit a called party to answer an incoming SIP-based call using a voice communication device, such as a cell phone, and to add subsequently multimedia services to that call without having to terminate the voice connection first. While communicating by telephone, the called party can download, through a browser running on a computer, a web page from a service node. The web page lists one or more actions that the called party can select to initiate communications in another form of media in addition to continuing the current voice communications. Examples of other media formats include, but are not limited to, application sharing, video conferencing, file transfer, and instant messaging. Based on the selected media, the service node establishes an additional media communication path between the SIP-enabled communication device used by the caller to initiate the call and the computer used by the called party to add the multimedia services. To establish this communication path, the service node "translates" SIP-based communication from the SIP-enabled communication device of the caller into web browser-based communications for sending to the computer of the called party, and web browser-based communications from the computer of the called party into SIP-based communications for sending to the SIP-enabled communication device of the caller.

Figure 13:
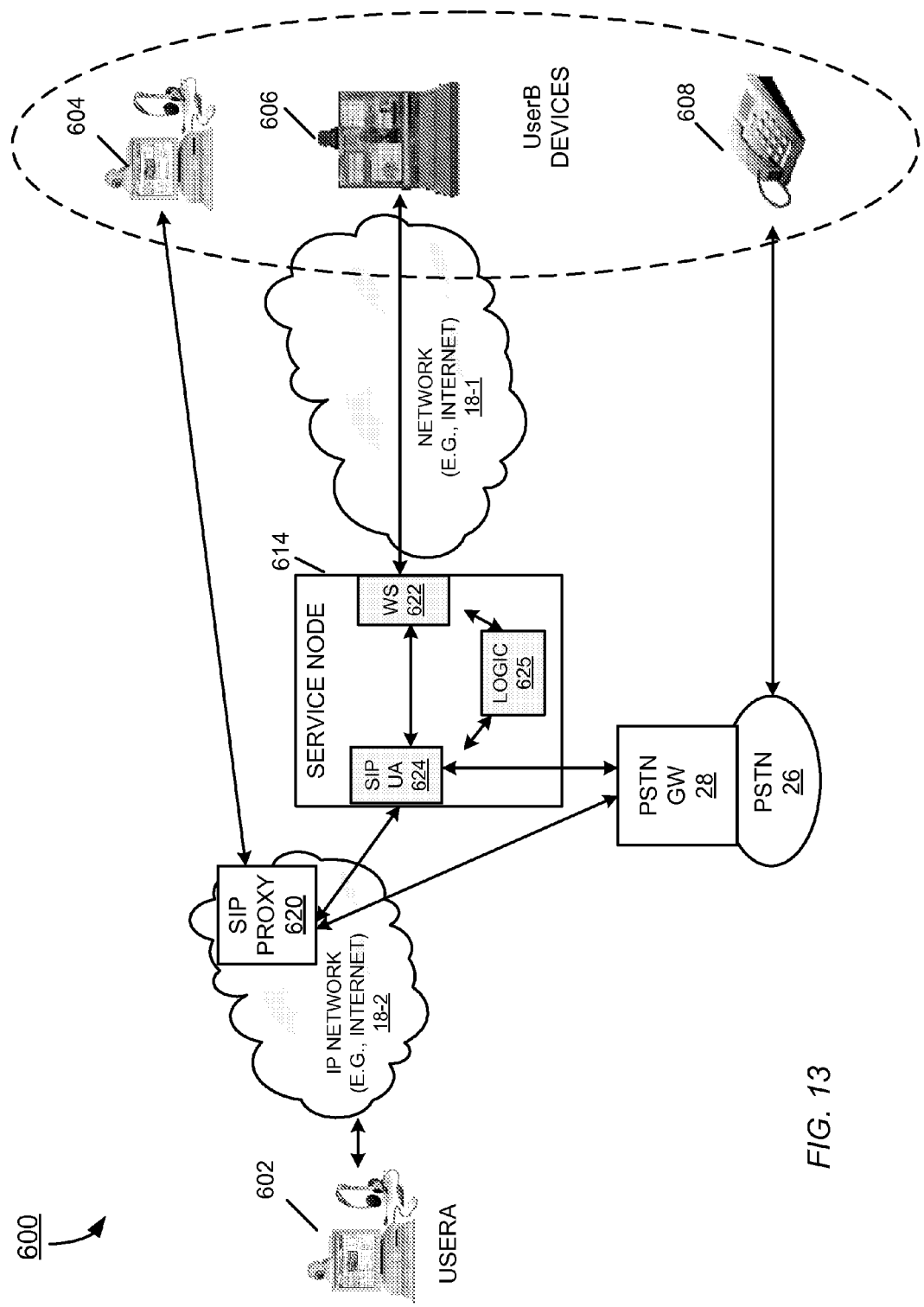
FIG. 13 is a diagram of another embodiment of a communications network including a service node for providing a communications bridge between a calling party using a SIP-enabled communication device to initiate a call and a called party having various communication devices with which to answer the call.

FIG. 13 shows an embodiment of a communications network 600 in which a calling party, UserA, uses a SIP-enabled communication device 602 to communicate with a called party, UserB. UserB has access to a plurality of communication devices with which to communicate with UserA: a SIP-enabled communication device 604, a non-SIP-enabled computing device 606, and a telephone 608. UserB can have access to other communication devices than those shown, for example, a cell phone.

The SIP-enabled communication device 602 of UserA and the SIP-enabled communication device 604 of UserB are in communication with a SIP proxy 620 over an IP network 18-2. The SIP proxy 620 is also in communication with a service node 614 and with a PSTN gateway 28. The non-SIP-enabled computing device 606 of UserB is in communication with the service node 614 over the network 18-1. The UserB telephone 608 is connected to the PSTN 26 through a PSTN gateway 28.

In general, the service node 614 operates as a SIP user agent for non-SIP-enable UserB communication devices (i.e., the service node 614 is one of a plurality of SIP clients registered for UserB). In addition to an SN-WS 622 (for serving web pages to web browsers) and an SN-SIP user agent 624 (for setting up communication sessions), the service node 614 includes service logic 625 for ringing specified communication devices, as described herein.

In brief overview, when the SIP-enabled UserA initiates a call to UserB, this causes all SIP user agents registered in UserB's ring list to ring. In this example, a SIP call "rings" the SIP-enabled communication device 604 and the service node 614. The service node 614 then rings one or more non-SIP-enabled communication devices (in accordance with the configuration of the service logic 625), such as the telephone 608. UserB may answer the call on any of the ringing communication devices (i.e., the telephone 608 or the SIP-enabled communication device 604). If UserB answers the call on the telephone 608, which is not multimedia-capable, UserB can then add to the existing call multimedia services via the non-SIP-enabled computing device 606, without terminating the voice connection to the telephone 608.

Figure 14A:
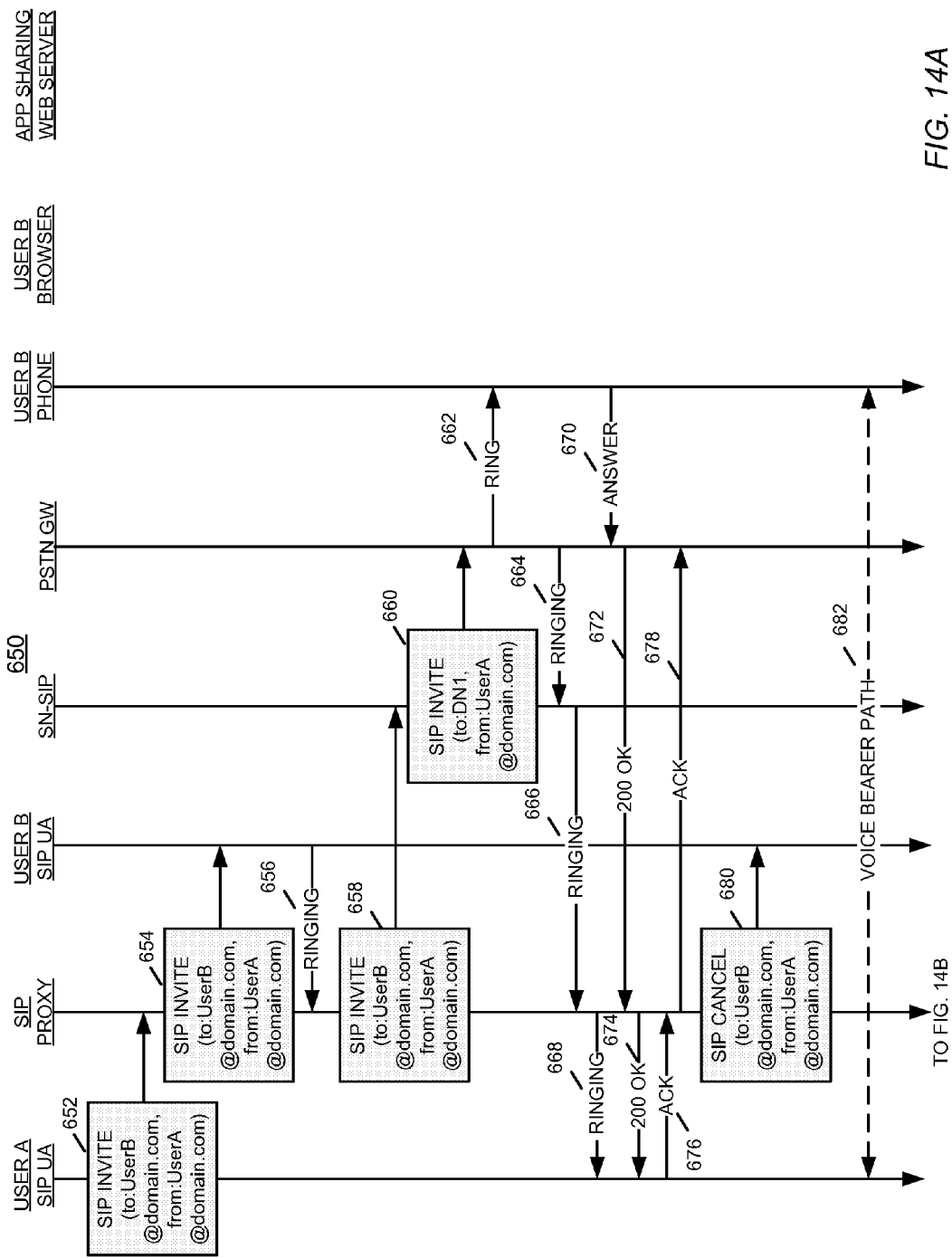
FIG. 14A and FIG. 14B comprise a sequence diagram of an embodiment of a process for enabling a called party to add media to an existing voice communication without having to terminate the voice connection.
Figure 14B:
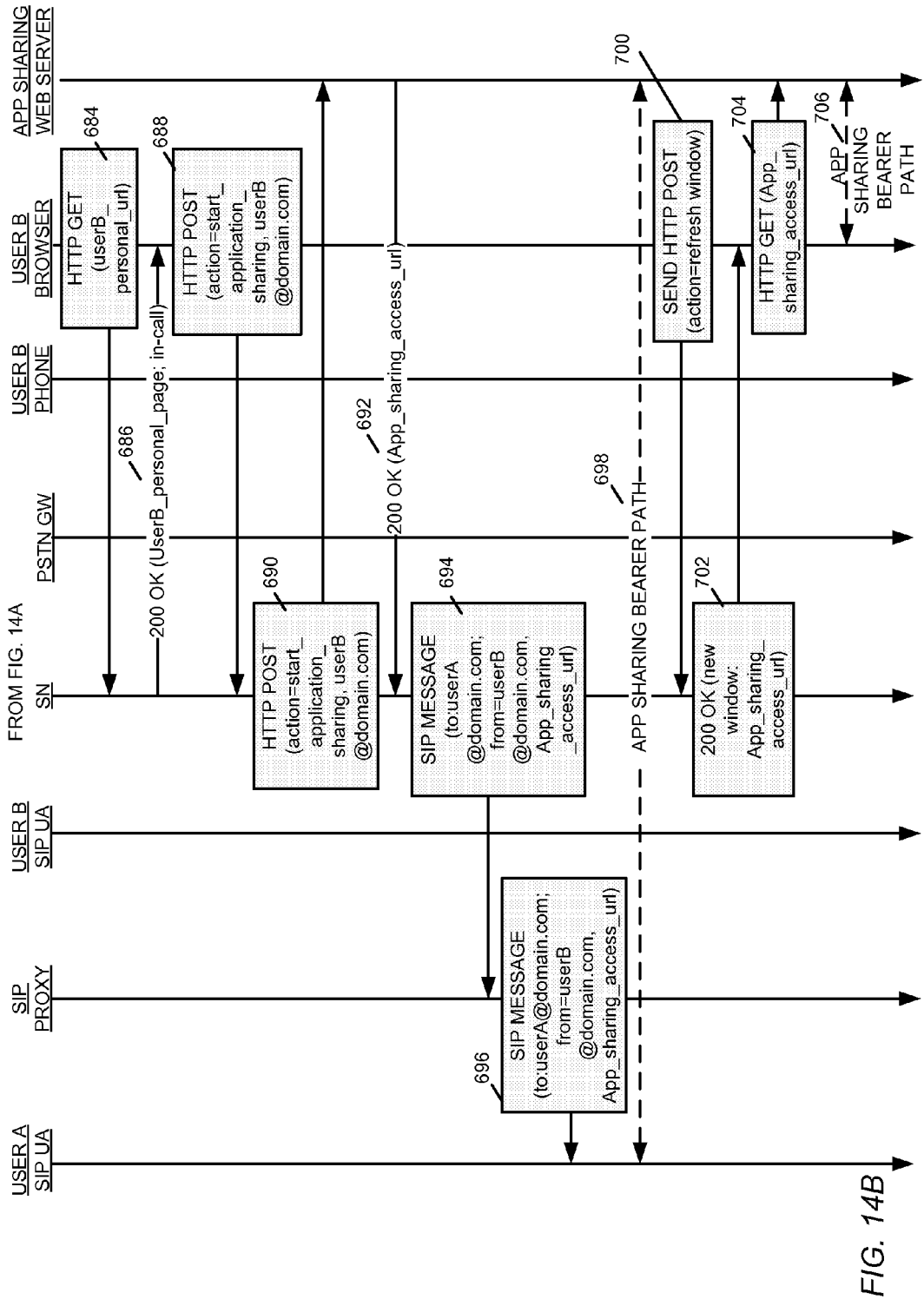

FIG. 14A and FIG. 14B show an embodiment of a process 650 for establishing a delayed multimedia session. In the description of the process 650, reference is also made to FIG. 13. Not every exchanged message is shown. Referring to FIG. 14A, when UserA initiates a call to UserB using the SIP-enabled communication device 602, its SIP user agent sends (step 652) a SIP Invite message to the SIP proxy 620. The SIP invite message provides the SIP address of the calling party (UserA) and the called party (UserB).

In response to this SIP invite message, the SIP proxy 620 sends a SIP invite message to each SIP client registered for UserB: in this example, the SIP proxy 620 sends (step 654) a SIP invite message to the SIP user agent of the SIP-enabled communication device 604 of UserB and (step 658) a SIP invite message to the service node 614—to be received by the SN-SIP user agent 624. The SN-SIP user agent of the UserB's computer 604 responds (step 656) to the SIP invite with a ringing indicator. Because in this example the service logic 625 is configured to ring UserB's telephone 608, referred to as DN1, the service node 614 responds to the SIP invite by sending (step 660) a SIP invite message to the PSTN gateway 28.

Through the PSTN 26, the PSTN gateway 28 rings (step 662) UserB's telephone 608 and sends (step 664) a ringing indicator to the service node 614. Upon receiving this ringing indicator, the service node 614 sends (step 666) a ringing indicator to the SIP proxy 620. The SIP proxy 620 then sends (step 668) a ringing indicator to the SIP user agent of UserA's computer 602.

Of the various communication devices, consider that UserB chooses to answer the telephone 608 (e.g., for convenience sake or because the SIP-enabled communication device 604 is used for other purposes). Accordingly, UserB's telephone 608 sends (step 670) an answer signal to the PSTN gateway 28. The PSTN gateway 28 notifies (step 672) the SIP proxy 620 of the answered call with a "200 OK" message. In response, the SIP proxy 620 notifies (step 674) the SIP user agent of UserA's computer 602. The SIP user agent of UserA's computer 602 acknowledges (step 676) the "200 OK" message, which induces the SIP proxy 620 to acknowledge (step 678) the "200 OK" message from the PSTN gateway 626. The SIP proxy 620 also sends (step 680) a SIP cancel message to the SIP user agent of UserB's computer 602 to terminate the ringing of that communication device. A voice-bearing communication path 682 is accordingly established between the UserA computer 602 and the UserB telephone 608 through the PSTN gateway 28.

Referring now to FIG. 14B, during the telephone call with UserA, UserB decides additional media is appropriate for their discussion. Through a web browser running on the non-SIP-enabled computing device 606, UserB activates a particular URL, causing the browser to send (step 684) an HTTP get message to the service node 614. This URL is personally associated with UserB and points to a particular web page hosted by the service node 614. To access the web page, UserB may need to authenticate with the service node 614 manually or automatically through a transmitted cookie.

The service node 614 transmits (step 686) this web page to the web browser of the UserB computer 606. In one embodiment, the transmitted web page resembles the window 170 of FIG. 4. The web page can indicate that UserB is currently on the telephone (i.e., call established) and show previously received information (e.g., a picture ID of UserA).

After UserB downloads the web page from the service node 614, either UserA or UserB can initiate additional media (e.g., video, text messaging, file transfers, application sharing). For illustration purposes, UserB is described as initiating application sharing. At step 688, UserB sends an HTTP post message to the SN-WS 22. The message requests the start of application sharing and identifies the SIP address of UserB. In response, the SN-WS 22 sends (step 690) an HTTP post message to the application-sharing web server 32 (FIG. 1), also requesting the start of application sharing and including the SIP address of UserB. The application-sharing web server 32 responds (step 692) with a "200 OK" message, and sends the service node 614 a URL for accessing application sharing (here, e.g., App_sharing_access_url).

The SN-SIP user agent 624 sends (step 694) a SIP message to the SIP proxy 620, indicating that the message is addressed to UserA from UserB and including the application sharing URL. At step 696, the SIP proxy 620 forwards the SIP message to the UserA SIP user agent. After the UserA browser sends an HTTP GET message to the application-sharing web server 32, an application sharing bearer path is established (step 698) between the application-sharing web server 32 and the UserB browser.

The UserB computer 606 periodically sends (step 700) an HTTP post message to the SN-WS 622 requesting a refresh of the window 170. When the SN-WS 622 receives one such HTTP post message after receiving the application-sharing URL from the application-sharing web server 32, the SN WS 622 sends (step 702) a "200 OK" message to the UserB browser with a new window, including the application sharing URL. The UserB browser then sends (step 704) an HTTP Get message directed to this application sharing access URL, which establishes an application sharing bearer path 706 between the UserB computer 606 and the application sharing web server 32. Accordingly, both UserA and UserB have established application sharing bearer paths with the application sharing web server 32, without terminating the existing voice-bearing path 682. UserB's acquired ability to communicate with UserA using additional media is thus gained transparently with respect to UserA.

Aspects of the present invention may be embodied in hardware (digital or analog), firmware, software (i.e., program code), or a combination thereof. Program code may be embodied as computer-executable instructions on or in one or more articles of manufacture, or in or on computer-readable medium. Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Generally, any standard or proprietary, programming or interpretive language can be used to produce the computer-executable instructions. Examples of such languages include C, C++, Pascal, JAVA, BASIC, Visual Basic, and C#. A computer, computing system, or computer system, as used herein, is any programmable machine or device that inputs, processes, and outputs instructions, commands, or data.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for presenting to a first user information about a second user to enable the first user to select an appropriate communication means for communicating with the second user, the method comprising:
    associating first and second uniform resource locators (URLs) with establishing communications with the second user, each of the first and second URLs providing access to a different set of one or more communications options for communicating with the second user;
    receiving, by a service node over a network from a web browser executing at a computing device used by the first user, a request for a web page identified by a given one of the first and second URLs associated with the second user, the web page corresponding to a web portal personally associated with the second user for accessing information related to the second user;
    collecting, by the service node over the network, information related to a current status of activity of the second user;
    determining, by the service node, one or more options for establishing communications with the second user depending at least on the given one of the first and second URLs used to identify the web page; and
    transmitting, by the service node over the network to the first user, the web page having the current activity of the second user and the determined one or more communications options.

2. The method of claim 1, wherein the step of collecting information by the service node occurs in response to receiving the request from the web browser.

3. The method of claim 1, wherein the determination of the one or more communication options is based on the current activity status of the second user.

4. The method of claim 1, further comprising the step of presenting the one or more communication options in the web page in a ranked order according to preferences established by the second user.

5. The method of claim 4, further comprising the step of dynamically updating, by the service node, the current activity status of the second user and the one or more communication options in real-time.

6. The method of claim 1, wherein the current availability status indicates at least one of an availability of the second user by telephone, whether the second user is actively online, a location of the second user, and a calendar-based scheduling item of the second user.

7. The method of claim 1, further comprising the steps of:
    receiving, by the service node, a request from a web browser executing on the computing device of the first user to establish communications with the second user in accordance with a communication option selected by the first user from the web page; and
    establishing, by the service node, communications between the computing or communication devices of the first user and a communication device of the second user in accordance with the selected communication option.

8. A service node comprising: memory storing computer-readable program code;
    a processor executing the computer-readable program code, the computer-readable program code adapted to provide:
        a web server component associating first and second uniform resource locators (URLs) with establishing communications with the second user, each URL providing a different level of access to information that may be collected about the second user, each URL providing access to a different set of the one or more communications options for communicating with the second user, and
        receiving from a web browser executing at a computing device used by a first user a request for a web page identified by a given one of the first and second URLs associated with a second user, the web page corresponding to a web portal personally associated with the second user for accessing information related to the second user;
        an information collector in communication over a network with one or more servers to obtain information related to a current status of activity of the second user; and
            logic for determining one or more options for establishing communications with the second user depending at least on the given one of the first and second URLs used to identify the web page,
        wherein the web server component transmits to the first user the web page having the current activity of the second user and the determined one or more communications options.

9. The service node of claim 8, wherein the information collector collects information in response to receiving the request from the web browser of the computing device of the first user.

10. The service node of claim 8, wherein the logic determines the one or more communication options based on the current activity status of the second user.

11. The service node of claim 8, wherein the logic presents the one or more communication options in the web page in a ranked order according to preferences established by the second user.

12. The service node of claim 11, wherein the web server transmits a dynamically updated web page to the first user when a change occurs in the current activity status of the second user and the one or more communication options.

13. The service node of claim 8, wherein the current availability status indicates at least one of an availability of the second user by telephone, whether the second user is actively online, a location of the second user, and a calendar-based scheduling item of the second user.

14. The service node of claim 8, wherein the web server component receives a request from the web browser executing on the computing device of the first user to establish communications with the second user in accordance with a communication option selected by the first user from the web page; and further comprising logic for establishing communications between the computing device of the first user and a communication device of the second user in accordance with the selected communication option.

15. A communications network for presenting to a first user of a computing device information about a second user to enable the first user to select an appropriate communication means for communicating with the second user comprising:
    one or more server systems maintaining information about a second user; and
    a service node in communication with the computing device of the first user and with the one or more server systems, the service node comprising:
    memory for storing computer-readable program code;
    a processor executing the computer-readable program code adapted to provide:

a web server component associating first and second uniform resource locators (URLs) with establishing communications with the second user, each URL providing a different level of access to information that may be collected about the second user, each URL providing subsets of the determined options for establishing communications with the second user, and receiving from a web browser executing at the computing device used by the first user a request for a web page identified by a given one of the first and second URLs associated with the second user, the web page corresponding to a web portal personally associated with the second user for accessing information related to the second user;

an information collector in communication with the one or more server systems to obtain information related to a current status of activity of the second user; and logic for determining one or more options for establishing communications with the second user depending at least on the given one of the first and second URLs used to identify the web page, wherein the web server component transmits to the first user the web page having the current activity of the second user and the one or more determined communications options.

16. The communications network of claim 15, wherein the information collector collects information in response to receiving the request from the web browser of the computing device of the first user.

17. The communications network of claim 15, wherein the logic determines the one or more communication options based on the current activity status of the second user.

18. The communications network of claim 15, wherein the logic presents the one or more communication options in the web page in a ranked order according to preferences established by the second user.

19. A method for presenting to a first user information about a second user to enable the first user to select an appropriate communication means for communicating with the second user, the method comprising:

associating first and second uniform resource locators (URLs) with establishing communications with the second user, each of the first and second URLs providing access to a different set of one or more communications options for communicating with the second user;

receiving, by a service node over a network from a web browser executing at a computing device used by the first user, a request for a web page identified by a given one of a first and second URLs associated with the second user, the web page corresponding to a web portal associated with the second user for accessing information related to the second user;

collecting, by the service node over the network, information related to a current status of activity of the second user;

determining, by the service node, one or more options for establishing communications with the second user depending at least on the given one of the first and second URLs used to identify the web page; and transmitting, by the service node over the network to the first user, the web page corresponding to the web portal associated with the second user, the web portal having the current activity of the second user and the determined one or more options for establishing communications with the second user;

receiving, by the service node in response to an option being selected by the first user through the web portal from the determined one or more options presented by the web portal, a request to establish communications with the second user; and initiating, by the service node, establishment of communications between the first user and the second user in accordance with the option selected through the web portal.

* * * * *